US012693613B2

(12) United States Patent
Ao et al.

(10) Patent No.: US 12,693,613 B2
(45) Date of Patent: Jul. 28, 2026

(54) STORAGE ASSEMBLY AND MOUNTABLE UNIT

(71) Applicant: JIANGXI YIBO E-TECH CO. LTD., Xinyu (CN)

(72) Inventors: Shiping Ao, Xinyu (CN); Jian Peng, Xinyu (CN); Yumin Fu, Xinyu (CN); Xiaomin Gong, Xinyu (CN); Haifeng Gu, Xinyu (CN); Qingyong Hu, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 16 days.

(21) Appl. No.: 18/932,942

(22) Filed: Oct. 31, 2024

(65) Prior Publication Data

US 2025/0053116 A1 Feb. 13, 2025

Related U.S. Application Data

(63) Continuation-in-part of application No. PCT/CN2023/091944, filed on May 3, 2023.

(30) Foreign Application Priority Data

May 4, 2022 (CN) ........................ 202221036914.X
May 12, 2022 (CN) ........................ 202221131528.9
(Continued)

(51) Int. Cl.
*G03G 15/08* (2006.01)
*G03G 15/00* (2006.01)
(Continued)

(52) U.S. Cl.
CPC ..... *G03G 15/0863* (2013.01); *G03G 15/0865* (2013.01); *G03G 15/80* (2013.01);
(Continued)

(58) Field of Classification Search
CPC ........... G03G 15/0863; G03G 15/0865; G03G 15/80; G03G 21/16; G03G 21/1652;
(Continued)

(56) References Cited

U.S. PATENT DOCUMENTS

2017/0269544 A1* 9/2017 Itabashi ............. G03G 21/1676
2019/0265641 A1* 8/2019 Yokoi ................ G03G 21/1871
2024/0393717 A1* 11/2024 Kusuda .................. G03G 21/16

FOREIGN PATENT DOCUMENTS

CN 207164470 U 3/2018
CN 208689369 U 4/2019
(Continued)

*Primary Examiner* — Sophia S Chen
(74) *Attorney, Agent, or Firm* — IPro, PLLC

(57) ABSTRACT

A storage assembly is configured to be mounted in an imaging device having an electrical contact point, separately from a developing cartridge. The storage assembly has a chip configured to store information of the developing cartridge, the chip having an electrical contact surface; a holder configured to support the electrical contact surface; and an elastic component on the holder and configured to urge the electrical contact surface. The developing cartridge may have a rotatable developing roller extending in a first direction. The electrical contact surface may be configured to electrically connect to the electrical contact point. The holder may support the chip. The electrical contact surface may be spaced apart from the developing roller in the first direction when the storage assembly and the developing cartridge are mounted in the imaging device.

20 Claims, 30 Drawing Sheets

(30) Foreign Application Priority Data

| | | |
|---|---|---|
| Aug. 9, 2022 | (CN) | 202222085829.9 |
| Feb. 25, 2023 | (CN) | 202320313510.9 |
| Mar. 4, 2024 | (CN) | 202420412567.9 |
| Apr. 20, 2024 | (CN) | 202420829028.5 |
| Sep. 27, 2024 | (CN) | 202422378212.5 |

(51) Int. Cl.
*G03G 21/16* (2006.01)
*G03G 21/18* (2006.01)

(52) U.S. Cl.
CPC ..... *G03G 21/1652* (2013.01); *G03G 21/1676* (2013.01); *G03G 21/1814* (2013.01); *G03G 21/1821* (2013.01); *G03G 2221/163* (2013.01)

(58) Field of Classification Search
CPC ............... G03G 21/1676; G03G 21/18; G03G 21/1814; G03G 21/1821; G03G 21/1871; G03G 21/1878; G03G 21/1885; G03G 2221/163
See application file for complete search history.

(56) References Cited

FOREIGN PATENT DOCUMENTS

| | | | |
|---|---|---|---|
| CN | 209765268 | U | 12/2019 |
| CN | 209784740 | U | 12/2019 |
| CN | 110308632 | B | 11/2021 |
| CN | 110426936 | B | 8/2022 |
| CN | 114839852 | A | 8/2022 |
| CN | 217484710 | U | 9/2022 |
| CN | 219872124 | U | 10/2023 |
| CN | 109856941 | B | 5/2024 |
| CN | 221225326 | U | 6/2024 |

* cited by examiner

Left

STORAGE ASSEMBLY AND MOUNTABLE UNIT

TECHNICAL FIELD

The present disclosure relates to the technical field of electronic photographic imaging, and in particular to a storage assembly and a mountable unit.

BACKGROUND

A process cartridge in the prior art generally includes a drum cartridge and a developing cartridge mounted in the drum cartridge, wherein a storage unit for identification by an imaging device is mounted on the developing cartridge. However, generally speaking, the service life of the drum cartridge and the storage unit is significantly longer than that of the developing cartridge. For example, for some models of process cartridges, the service life of the drum cartridge and the storage unit can match the service life of multiple developing cartridges. Therefore, when developer in the developing cartridge is consumed, it is necessary to replace it with a new developing cartridge. At this time, the storage unit mounted in the developing cartridge will be discarded together with the developing cartridge. On the one hand, this causes great waste. On the other hand, because the storage unit is relatively expensive, frequent replacement of the storage unit will increase the printing cost.

SUMMARY

In order to solve the above problems, the present disclosure provides a new process cartridge, which is mainly realized through the following technical solutions:

Disclosed herein is a storage assembly. The storage assembly is configured to be mounted in an imaging device having an electrical contact point, separately from a developing cartridge. The storage assembly comprises a chip configured to store information of the developing cartridge, the chip having an electrical contact surface; a holder configured to support the electrical contact surface; and an elastic component on the holder and configured to urge the electrical contact surface.

In an embodiment, the elastic component is configured to move in a direction intersecting the electrical contact surface, causing the electrical contact surface to move toward the electrical contact point.

In an embodiment, the elastic component is between the holder and the electrical contact surface, and the electrical contact surface is configured to move relative to the holder as a result of movement of the elastic component.

In an embodiment, the holder comprises a first holder and a second holder, the first holder is configured to support the electrical contact surface, and the first holder is movable relative to the second holder.

In an embodiment, the first holder comprises an elastic buckle thereon and the second holder comprises a slide groove thereon or the second holder comprises the elastic buckle thereon and the first holder comprises the slide groove thereon. The elastic buckle is configured to connect with the slide groove.

In an embodiment, in another direction intersecting the electrical contact surface, the holder comprises, on one side thereof, a chip accommodating portion for accommodating the chip, and on another side thereof, the elastic component.

In an embodiment, the elastic component is an elastic sheet integral with and extending from one side of the holder.

Disclosed herein is a storage assembly. The storage assembly is configured to be mounted in an imaging device having an electrical contact point, separately from a developing cartridge comprising a rotatable developing roller extending in a first direction. The storage assembly comprises a chip configured to store information of the developing cartridge, the chip having an electrical contact surface configured to electrically connect to the electrical contact point; and a holder configured to support the chip. The electrical contact surface is spaced apart from the developing roller in the first direction when the storage assembly and the developing cartridge are mounted in the imaging device.

In an embodiment, the developing cartridge has a first side surface and a second side surface separately disposed in the first direction. When the storage assembly and the developing cartridge are mounted in the imaging device, at least a part of the electrical contact surface is farther away from the second side surface of the developing cartridge in the first direction than the first side surface of the developing cartridge is from the second side surface of the developing cartridge in the first direction.

In an embodiment, the imaging device further comprises a drum cartridge. The storage assembly further comprises a supported surface. The drum cartridge comprises a photosensitive drum and a drum frame supporting the photosensitive drum. The drum frame comprises a supporting surface, and the supported surface is configured to be supported by the supporting surface. In a direction intersecting the electrical contact surface, the supported surface is on a side of the holder away from the electrical contact surface.

In an embodiment, the holder comprises a connecting portion connected to the drum frame. When the electrical contact surface is upward in an up-down direction, the connecting portion is below the electrical contact surface in the up-down direction.

In an embodiment, the connecting portion comprises a first connecting portion and a second connecting portion, the drum frame comprises a first clamping portion and a second clamping portion, the first connecting portion is configured to connect with the first clamping portion, and the second connecting portion is configured to connect with the second clamping portion. The first connecting portion and the second connecting portion are arranged in a second direction intersecting the first direction.

In an embodiment, the drum frame has a first side and a second side separated in the first direction, the drum frame comprises a supporting protrusion extending in the first direction from the first side, and the holder is configured to be supported by the supporting protrusion.

In an embodiment, the supporting protrusion comprises a surface facing the electrical contact surface, the surface comprises a positioning protrusion extending outward, the holder comprises a mounting hole, and the holder is configured to be positioned and mounted on the drum frame by mating the mounting hole and the positioning protrusion.

In an embodiment, the mounting hole and the electrical contact surface have an overlapping portion in a direction intersecting the electrical contact surface.

Disclosed herein is a mountable unit, comprising a storage assembly and a developing cartridge. The developing cartridge is configured to be mounted in an imaging device having an electrical contact point, separately from the storage assembly. The imaging device comprises a first accommodating area and a second accommodating area. The developing cartridge is accommodated in the first accommodating area, and the storage assembly is accommodated in the second accommodating area. The first accommodating area and the second accommodating area are adjacent to each other in a first direction. The first accommodating area comprises a photosensitive drum, and the second accommodating area comprises an electrical contact point. The storage assembly comprises a chip with an electrical contact surface, and the chip is configured to store information of the developing cartridge. The developing cartridge comprises a casing configured to accommodate developer and a developing roller rotatable about a developing roller axis extending in the first direction. The electrical contact surface is spaced apart from the developing roller in the first direction when the developing cartridge and the storage assembly are mounted in the imaging device.

In an embodiment, when the storage assembly and the developing cartridge are mounted in the imaging device, at least a part of the electrical contact surface is further away from an end of the casing closer to the electrical contact surface in the first direction than an end of the developing roller is from an end of the casing closer to the electrical contact surface in the first direction.

In an embodiment, the developing cartridge further comprises an input gear configured to receive an external driving force, and the electrical contact surface is further away from the developing roller in the first direction than the input gear is from the developing roller in a second direction intersecting the first direction.

In an embodiment, the storage assembly comprises a holder configured to support the chip, the holder comprising a gripping portion, and a height of the gripping portion in a second direction intersecting the first direction is equal to or less than 9 mm.

In an embodiment, a length of the storage assembly in a third direction intersecting the first direction is equal to or greater than 25 mm and is equal to or less than 31 mm.

In the present disclosure, the storage assembly is detachably mounted on the drum cartridge. When the process cartridge is in use, the storage assembly on the drum cartridge can establish a communication connection with an imaging device independently of the developing cartridge. Thus, even if the storage assembly is not provided on the developing cartridge, the process cartridge can be used normally, thereby making the process cartridge more convenient to use. In addition, after the developer in the developing cartridge is used up, only the developing cartridge needs to be handled, such as adding developer or replacing the developing cartridge with a new one, without replacing the storage assembly. On the other hand, the same storage assembly can be matched and used with multiple developing cartridges, and the storage assembly does not need to be replaced frequently, which is beneficial to improving the economic efficiency of the drum cartridge.

DETAILED DESCRIPTION

Embodiment 1

Figure 1:
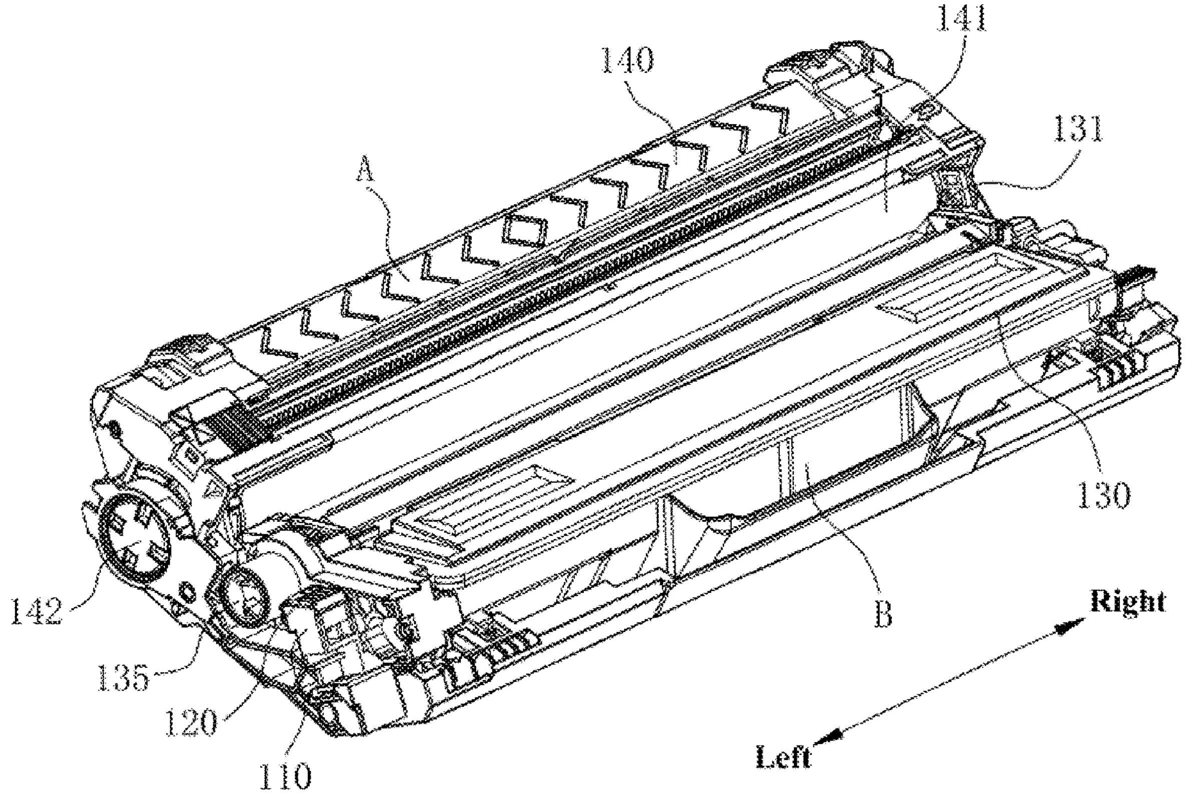
FIG. 1 is a schematic view of a developing cartridge according to Embodiment 1 of the present disclosure that is mounted in a drum cartridge, from one angle.
Figure 2:
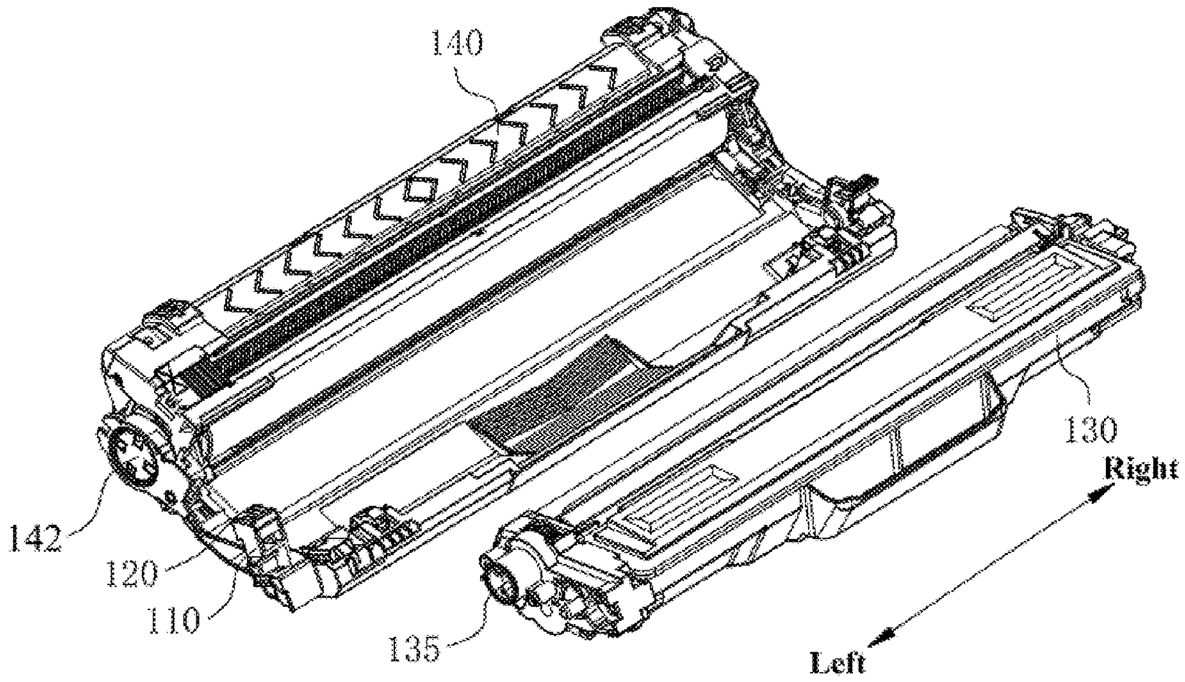
FIG. 2 is a schematic view of the developing cartridge according to Embodiment 1 of the present disclosure that is separated from the drum cartridge, from one angle.
Figure 3:
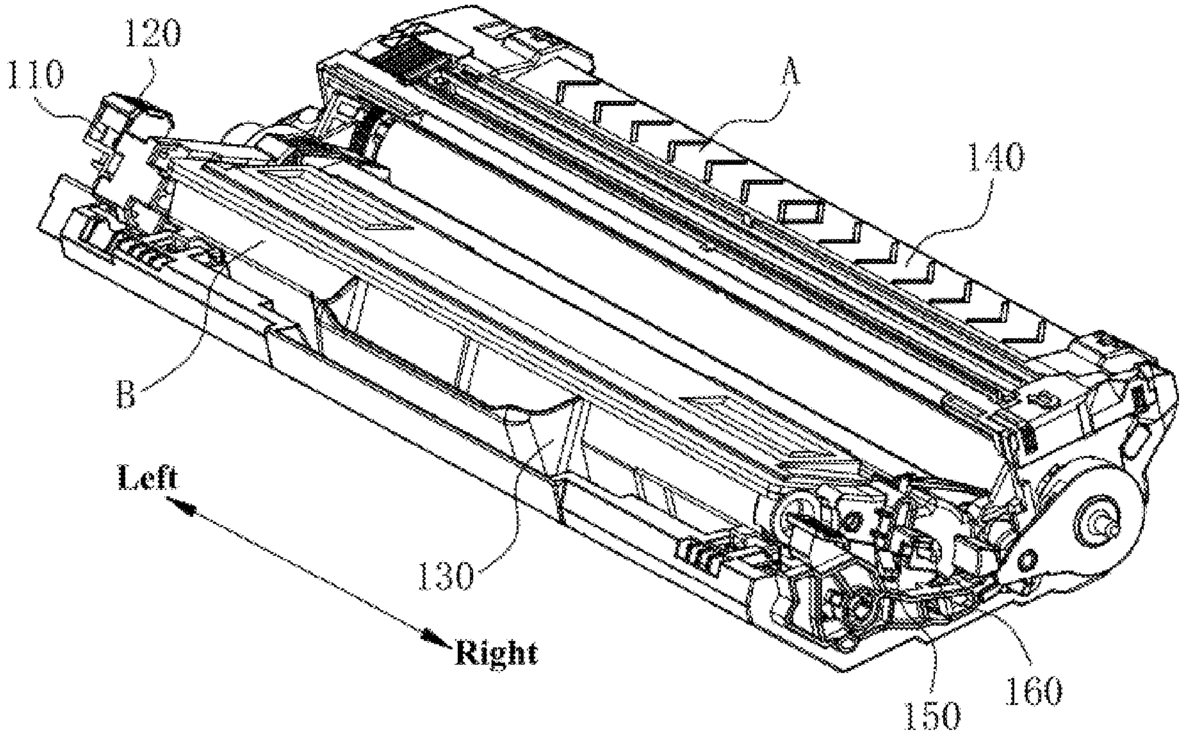
FIG. 3 is a schematic view of the developing cartridge according to Embodiment 1 of the present disclosure that is mounted in the drum cartridge, from another angle.
Figure 4:
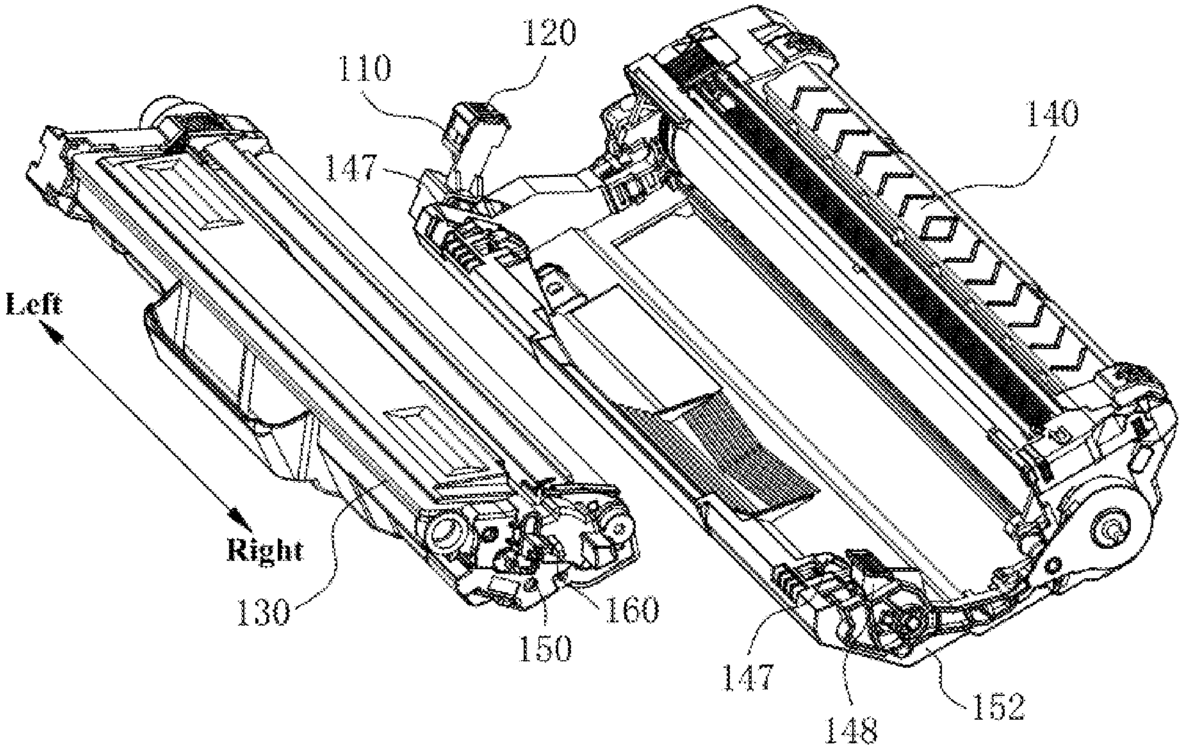
FIG. 4 is a schematic view of the developing cartridge according to Embodiment 1 of the present disclosure that is separated from the drum cartridge, from another angle.
Figure 5:
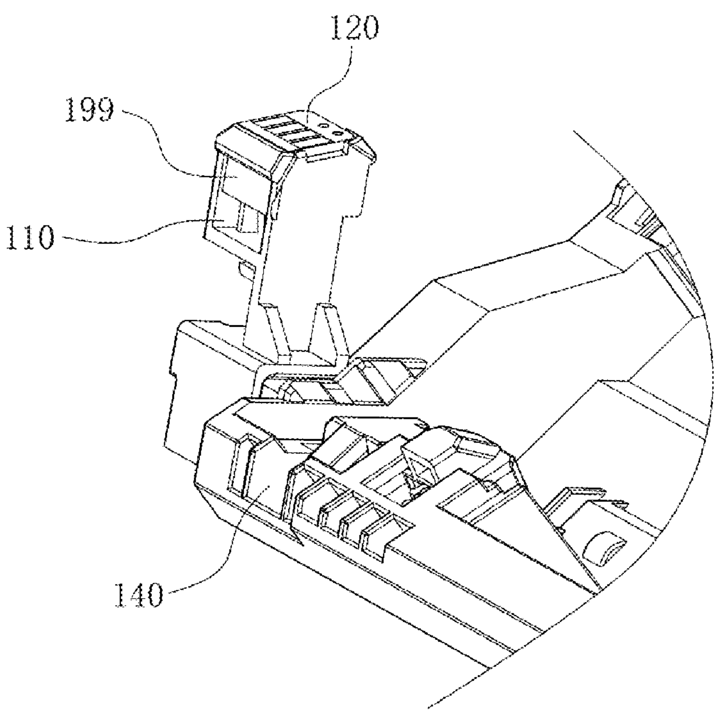
FIG. 5 is a schematic view of a storage assembly according to Embodiment 1 of the present disclosure when it is mounted on a drum frame, from one angle.
Figure 6:
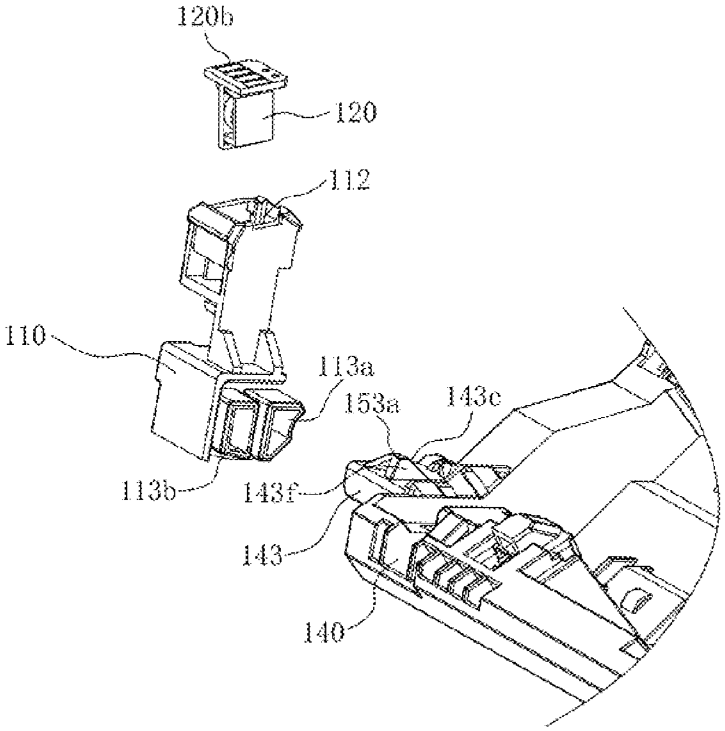
FIG. 6 is a schematic view of the storage assembly according to Embodiment 1 of the present disclosure that is separated from the drum frame, from one angle.
Figure 7:
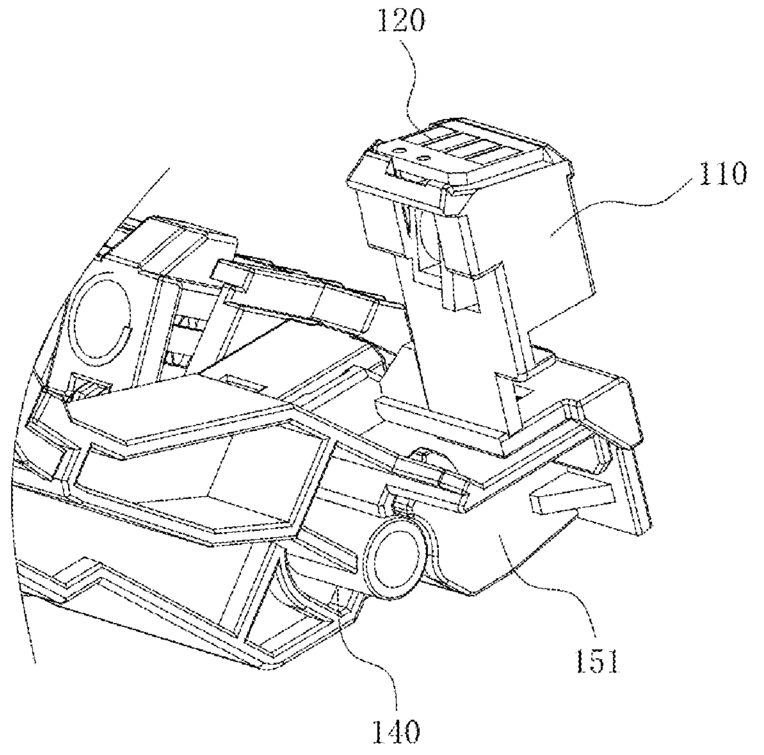
FIG. 7 is a schematic view of the storage assembly according to Embodiment 1 of the present disclosure when it is mounted on a drum frame, from another angle.
Figure 8:
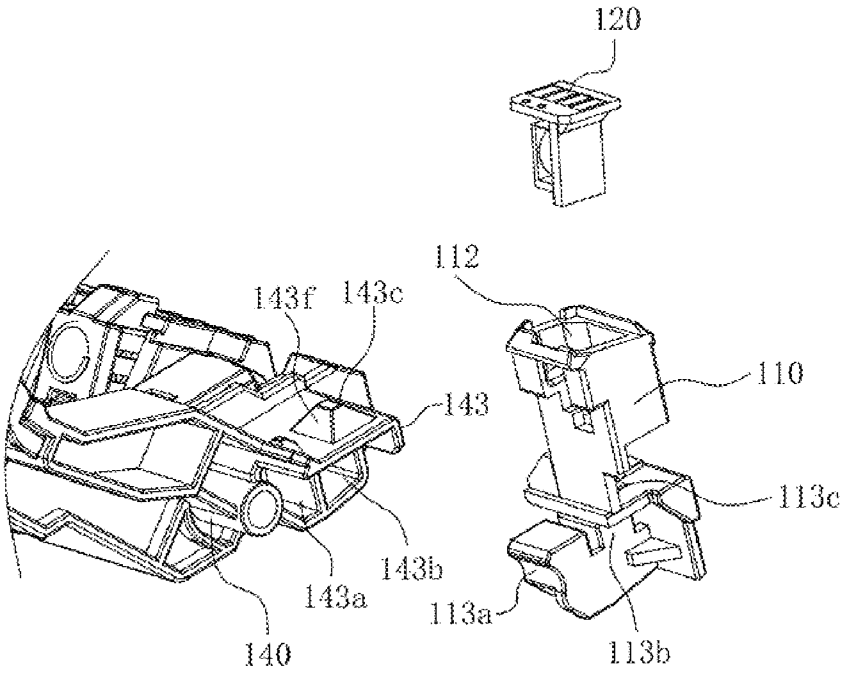
FIG. 8 is a schematic view of the storage assembly according to Embodiment 1 of the present disclosure that is separated from the drum frame, from another angle.
Figure 9:
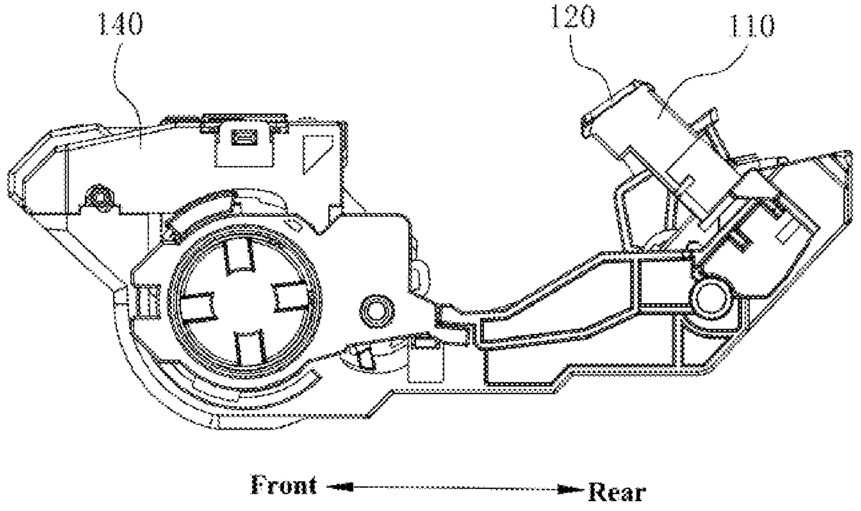
FIG. 9 is a schematic view of the storage assembly according to Embodiment 1 of the present disclosure that is mounted on the drum frame.
Figure 10:
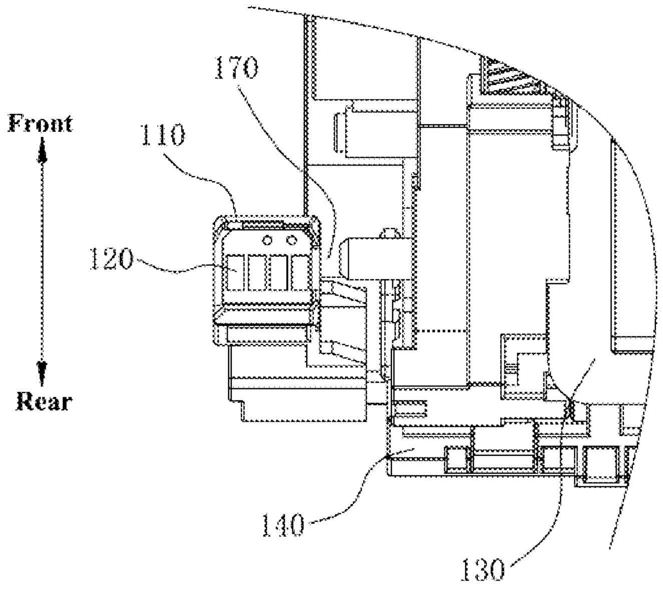
FIG. 10 is a schematic view of the storage assembly and the developing cartridge according to Embodiment 1 of the present disclosure that are mounted in the drum cartridge, from still another angle.
Figure 11:
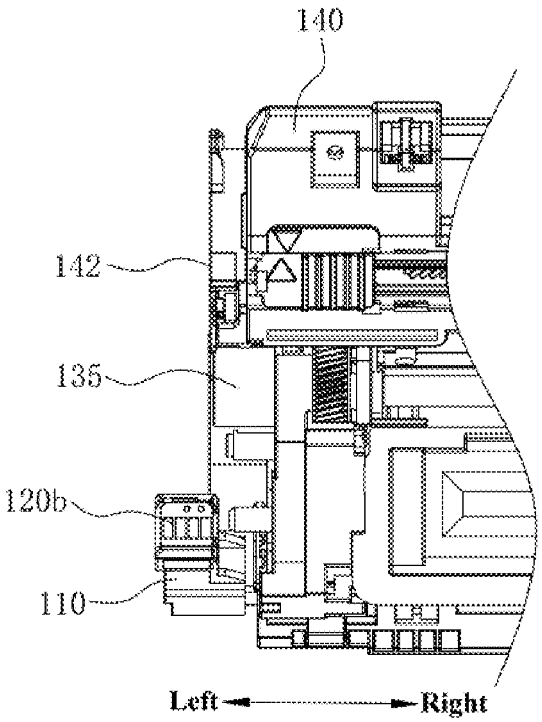
FIG. 11 is a schematic view of the storage assembly and the developing cartridge according to Embodiment 1 of the present disclosure that are mounted in the drum cartridge, from further another angle.
Figure 12:
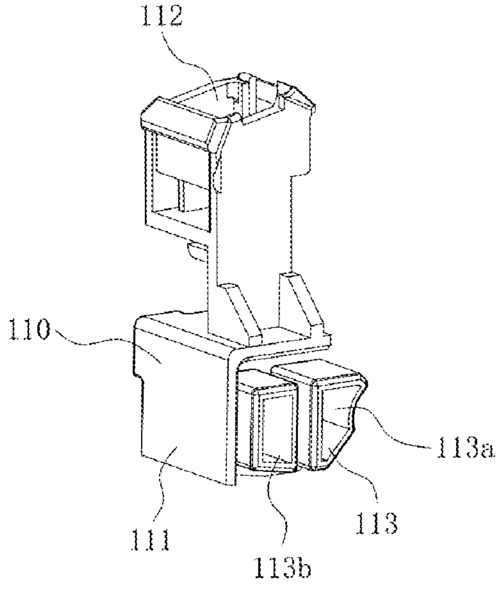
FIG. 12 is a schematic view of a storage unit mounting frame according to Embodiment 1 of the present disclosure from one angle.
Figure 13:
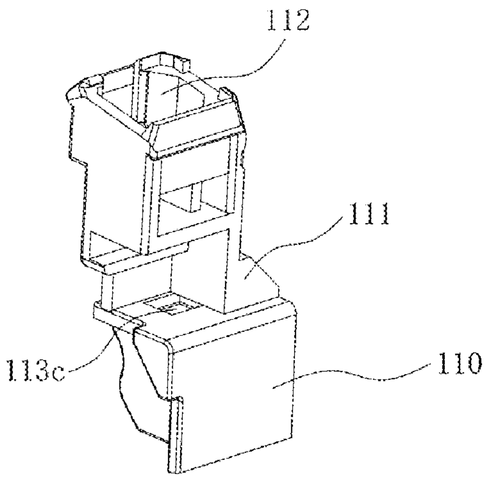
FIG. 13 is a schematic view of the storage unit mounting frame according to Embodiment 1 of the present disclosure from another angle.
Figure 14:
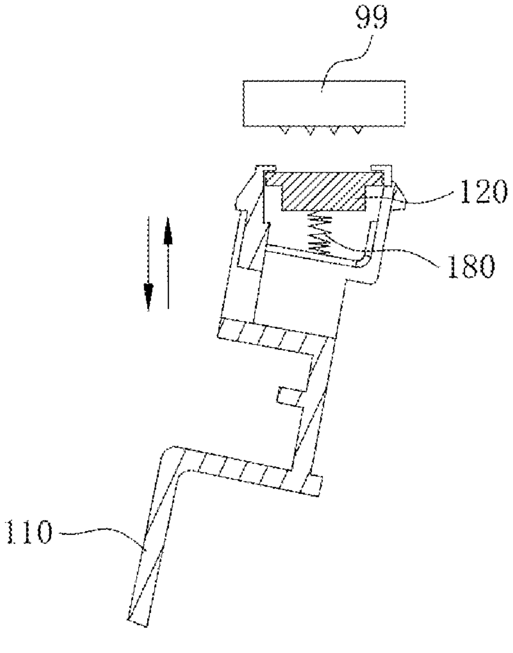
FIG. 14 is a schematic view of the storage unit mounting frame, a storage unit and a storage unit connector according to Embodiment 1 of the present disclosure.

As shown in FIGS. 1-14, a storage assembly 199, a mountable unit and a process cartridge of the present disclosure are shown. The process cartridge includes a drum cartridge A and a developing cartridge B that are separately disposed. The storage assembly 199 and the developing cartridge B may be independently and detachably mounted in the drum cartridge A. The storage assembly 199, the developing cartridge B and the drum cartridge A may be mounted in an imaging device as an integral unit.

Developing Cartridge

The developing cartridge B includes a developing frame 130 capable of accommodating developer, and a developing roller 131 that is rotatably supported on the developing frame 130. The developing cartridge B further includes a developing cartridge driving portion 135 disposed at the left end of the developing frame 130. The developing cartridge driving portion 135 may receive a driving force from the outside of the developing cartridge B and drive the developing roller 131 to rotate about a developing roller axis extending along a left-right direction. In addition, the developing cartridge B further includes a detection protrusion 150 and an electrode contact portion 160 disposed at the right end of the developing frame 130. The detection protrusion 150 and the electrode contact portion 160 is disposed at intervals in a front-rear direction, and the electrode contact portion 160 is closer to the developing roller axis than the detection protrusion 150 in the front-rear direction, that is, the electrode contact portion 160 is disposed on the front side of the detection protrusion 150 in the front-rear direction. The electrode contact portion 160 may receive power from the imaging device to supply power to the developing roller 131. The detection protrusion 150 may be detected by the imaging device to form a detection signal. The imaging device may determine, by identifying the detection signal, information about whether the developing cartridge B is a new cartridge or not, the capacity of the developing cartridge B, etc.

Drum Cartridge

As a drum cartridge A used in cooperation with the developing cartridge B, the drum cartridge A includes a drum frame 140, and a developing cartridge accommodating portion capable of being accommodating the developing cartridge B is provided on the drum frame 140. On the rear side of the frame 140, a pair of urging protrusions 147 are further provided at the left and right ends of the frame 140. When the developing cartridge B is mounted in the drum cartridge A, the urging protrusions 147 may elastically urge the developing cartridge B so that the developer roller 131 can move toward a photosensitive drum 141 to ensure that the developer roller 131 maintains close contact with the photosensitive drum 141. On the rear side of the drum frame 140, a locking protrusion 148 is further provided at the right end of the drum frame 140. The locking protrusion 148 may be used to lock the developing cartridge B in the drum cartridge A when the developing cartridge B is mounted in the drum cartridge A, so as to prevent the developing cartridge B from being separated from the drum cartridge A. The drum cartridge A further includes the photosensitive drum 141 rotatably supported on the drum frame 140. When the developing cartridge B is mounted in the drum cartridge A and the process cartridge is in a working state, the developing cartridge B is in a contact position where the developing roller 131 and the photosensitive drum 141 maintain close contact with each other. When the developing cartridge B is mounted in the drum cartridge A and the process cartridge is in a non-working state, the developing cartridge B is in a separation position where the developing roller 131 and the photosensitive drum 141 are separated from each other, so as to prevent the development roller 131 and the photosensitive drum 141 from maintaining close contact for a long time when the process cartridge is in the non-working state, resulting in the precipitation of a substance on the developing roller 131 to contaminate the smooth photosensitive drum 141. In other words, in order to avoid the aforementioned defect, the developing cartridge B needs to swing around the drum cartridge A between the contact position and the separation position. When the developing cartridge B is switched from the working state to the non-working state, the urging protrusions 147 may receive an urging force from the imaging device and drive the developing cartridge B to swing around the drum cartridge A for a certain distance, so that the developing roller 131 provided on the developing cartridge B is separated from the photosensitive drum 141 provided on the drum cartridge A. A drum cartridge driving unit 142 is further mounted on the front side of the left end of the photosensitive drum 141. The drum cartridge driving unit 142 may receive a driving force from the imaging device to rotate the photosensitive drum 141, so that the photosensitive drum 141 can rotate about a photosensitive drum rotation axis extending along the left-right direction.

Storage Assembly

As a storage assembly 199 provided in this embodiment, the storage assembly 199 may be detachably mounted on the drum cartridge A independently of the aforementioned developing cartridge B, and the storage assembly 199 includes a storage unit mounting frame 110 detachably mounted on the drum frame 140 and a storage unit 120 mounted on the storage unit mounting frame 110.

The position of an electrical contact surface 120*b* of the storage unit 120 in the drum frame 140 in the present embodiment is different from that in the aforementioned embodiment. Specifically, the electrical contact surface 120*b* is disposed on the left side of the drum frame 140 in the left-right direction and on the rear side of the drum frame 140 in the front-rear direction, and the electrical contact surface 120*b* is disposed to face the upper side of the drum frame 140, wherein the storage unit 120 includes a substrate that is roughly configured in a plate shape, and the substrate includes a first surface and a second surface that are disposed opposite to each other. In the following description, when the storage assembly 199 is mounted in the drum cartridge A, it is defined that the first surface is arranged to face the lower end of the drum frame 140, and the second surface is arranged to face the upper end of the drum frame 140. The electrical contact surface 120*b* is provided on the first surface of the substrate. The electrical contact surface 120*b* may be electrically connected to the imaging device, and is arranged on the front side of the drum frame 140 in the front-rear direction and on the left side of the drum frame 140 in the left-right direction. A storage portion is further provided on the second surface of the substrate, and the storage portion stores relevant parameter information, such as model, of the drum cartridge A or the developing cartridge B. The storage unit 120 further includes an electrical connection portion (not shown) that electrically connects the electrical contact surface 120*b* and the storage portion so that the two maintain electrical connection. The storage unit 120 may identify the relevant parameter information in the storage portion through the electrical contact between the electrical contact surface 120*b* and the imaging device. Alternatively, the storage unit 120 in this embodiment does not need to be disposed entirely at the left end of the drum frame 140. Instead, only the electrical contact surface 120*b* on the storage unit 120 may be disposed at the left end of the drum frame 140, and the storage portion may be disposed in other positions other than the left end of the drum frame 140. The electrical contact surface 120*b* and the storage portion may be connected through an electrical connection portion made of a conductive material, thereby allowing the electrical contact surface 120*b* to transfer power received from the imaging device to the storage portion. Next, the structure of the storage unit mounting frame 110 and the structure on the drum cartridge A that cooperates therewith will be described in detail.

The storage unit mounting frame 110 includes a storage unit accommodating portion 112 for mounting the storage unit 120. The storage unit 120 can be adhered to the storage unit accommodating portion 112 by, for example, gluing. However, it is not limited thereto. The storage unit 120 may also be mounted on the storage unit accommodating portion 112 by providing an elastic buckle structure on the storage unit mounting frame 110. There are many ways to implement it, as long as the storage unit 120 can be firmly mounted on the storage unit accommodating portion 112. The storage unit mounting frame 110 also includes a positioning portion 113, which may not only be used to correctly position and install the storage unit mounting frame 110 on the drum frame 140, but also prevent the storage unit mounting frame 120 from easily detaching from the drum frame 140. The specific structure of the positioning portion 113 may vary according to the specific structure of the drum frame 140, and it is not limited thereto. For the convenience of description, next, the present disclosure will be introduced by selecting a preferred embodiment. Specifically, a supporting surface is provided on the drum frame 140, a supported surface is provided on the storage unit mounting frame 110, and the supported surface may be supported by the supporting surface, Moreover, a supporting protrusion 143 is provided on the drum frame 140, and a positioning portion 113 configured as a supported protrusion is provided on the storage unit mounting frame 110. Hereinafter, the positioning portion 113 may be regarded as an embodiment of the supported protrusion. The supporting surface serves as a surface of the supporting protrusion 143, and the supported surface serves as a surface of the positioning portion 113 that cooperates with the supporting protrusion 143. The storage unit mounting frame 110 is supported on the supporting protrusion 143 through the positioning portion 113 and thus mounted on the drum frame 140. More specifically, the drum frame 140 has a first side surface 151 located at the left end and a second side surface 152 located at the right end. The supporting protrusion 143 is configured as a protrusion protruding to the left from the first side surface 151, and a surface 153*a* facing the electrical contact surface 120*b* is provided on the supporting protrusion 143. A positioning protrusion 143*c* protruding outward is provided on the surface 153*a*, and the positioning protrusion 143*c* is in a “pyramid” shape, and has inclined surfaces 143*f* that face the front side, right side, left side, and right side of the drum frame 140, respectively. As a structure on the storage unit mounting frame 110 that is mounted in cooperation with the positioning protrusion 143*c*, the storage unit mounting frame 110 is provided with a mounting hole 113*c*, and the mounting hole 113*c* is disposed to have an overlapping portion with the electrical contact surface 120*b* in a direction perpendicular to the electrical contact surface 120*b*, so as to reduce the shaking of the storage unit mounting frame 110 and enhance the positioning stability of the storage unit mounting frame 110. During the process of mounting the storage unit mounting frame 110 to the drum frame 140 along the installation direction from left to right, the positioning protrusion 143*c* may squeeze the outer wall of the storage unit mounting frame 110 to force it to deform, so as to allow the positioning protrusion 143*c* to be smoothly inserted into the mounting hole 113*c*. In other words, the storage unit mounting frame 110 may be elastically deformed when subjected to force. After the positioning protrusion 143*c* and the mounting hole 113*c* are mounted in cooperation, the storage unit mounting frame 110 can be more stably mounted on the drum frame 140, preventing the storage unit mounting frame 110 from easily detaching from the drum frame 140.

In order to further enhance the installation stability of the storage unit mounting frame 110, a positioning protrusion configured as a supported protrusion is further provided on the storage unit mounting frame 110. Preferably, the supported protrusion includes a first positioned protrusion 113*a* and a second positioned protrusion 113*b*, and the first positioned protrusion 113*a* and the second positioned protrusion 113*b* are disposed adjacent to and spaced apart from each other in the front-rear direction. As a structure on the drum frame 140 that is mounted in cooperation with the first positioned protrusion 113*a* and the second positioned protrusion 113*b*, a first positioning hole 143*a* and a second positioning hole 143*b* are provided on the supporting protrusion 143 on the drum frame 140. When the storage unit mounting frame 110 is mounted on the drum frame 140, the first positioned protrusion 113*a* and the second positioned protrusion 113*b* may be matched with and mounted in the first positioning hole 143*a* and the second positioning hole 143*b* of the drum frame 140, respectively, so that the storage unit mounting frame 110 can be stably positioned. Optionally, the storage unit mounting frame 110 includes a clamping portion for positioning, wherein the number of clamping portions is variable. The storage unit mounting frame 110 may also be positioned by only providing any one or two of the first positioned protrusion 113*a* and the second positioned protrusion 113*b*. After adopting the aforementioned structure, the storage unit mounting frame 110 of the process cartridge in the present disclosure is mounted along a direction substantially parallel to the left-right direction. More specifically, the storage unit mounting frame 110 is mounted from left to right, but the installation direction is also not fixed. It is still possible to choose to adopt other positioning structures to mount the storage unit mounting frame 110 in the front-rear direction or the up-down direction, for example.

In order to further improve the positioning stability of the storage unit mounting frame 110 and prevent the storage unit mounting frame 110 from being separated from the drum frame 140, the storage unit mounting frame 110 is mounted on the drum frame 140 in an interference fit manner. The interference fit between the two may be achieved through the cooperation of the first positioned protrusion 113*a* and the second positioned protrusion 113*b* with the first positioning hole 143*a* and the second positioning hole 143*b*. That is to say, the first positioned protrusion 113*a* and the second positioned protrusion 113*b* are mounted in the first positioning hole 143*a* and the second positioning hole 143*b* in an interference fit manner, respectively.

Further, an elastic component 180 is further provided between the storage unit mounting frame 110 and the storage unit 120. The elastic component 180 is configured to be compressed and deformed into the storage unit mounting frame 110 after the storage unit 120 receives external force such as a storage unit connector 99 of the imaging device and pressed, and at least a part of the elastic force generated by the compression deformation may push the storage unit 120 to move toward the storage unit connector 99, thereby maintaining the elastic abutment between the storage unit 120 and the storage unit connector 99. This may not only effectively avoid the situation where the storage unit 120 and the storage unit connector 99 are damaged by hard contact during the installation process, but also avoid the situation where the actual installation position of the storage unit 120 deviates greatly from the correct installation position due to the manufacturing error of the storage unit mounting frame 110, resulting in the storage unit 120 being unable to be electrically connected to the storage unit connector 99 or the two interfering with each other during installation. That is to say, the electrical contact surface 120*b* in this embodiment is movable relative to the photosensitive drum 141.

It is worth mentioning that, in the process of mounting the developing cartridge B to the drum cartridge A, in order to prevent the storage unit mounting frame 110 or the storage unit 120 from blocking the installation of the developing cartridge B and causing installation interference, an avoidance space 170 is provided on at least one of the storage unit mounting frame 110 and the developer frame 130, so that in the process of mounting the developing cartridge B to the drum cartridge A, there will be no installation interference with the storage assembly 199 to block the installation of the developing cartridge B. Further, when the storage assembly 199 and the developing cartridge B are both mounted in the drum cartridge A, at least a part of the electrical contact surface **120*b* is disposed farther away from the right end of the drum frame 140 in the left-right direction than the left end of the developing cartridge driving portion 135. That is to say, at least a part of the electrical contact surface 120*b* is disposed farther outward in the left-right direction than the left end of the developing cartridge driving portion 135, so that the electrical contact surface 120*b* is as far away from the electrode contact portion 160** as possible in the left-right direction, so as to reduce the probability of electrical interference between the two when the process cartridge is working.

Mountable Unit

The present disclosure further provides a mountable unit. The mountable unit includes a developing cartridge B and a storage assembly 199 that may each be independently mounted in the aforementioned drum cartridge A. When a user uses the developing cartridge B and the storage assembly 199 for the first time, he may mount the storage assembly 199 in the mountable unit into the drum cartridge A, then mount the developing cartridge B into the drum cartridge A, and finally, mount the three as a whole into the imaging device.

Embodiment 2

Figure 15:
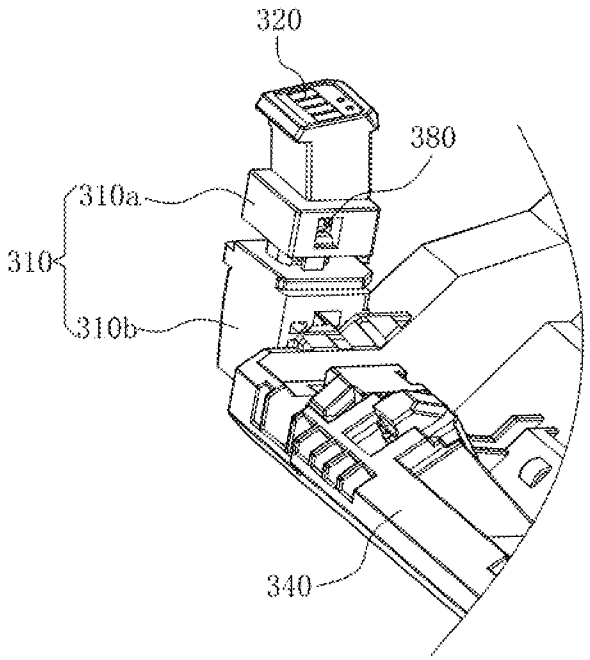
FIG. 15 is a schematic view of a storage assembly according to Embodiment 2 of the present disclosure that is mounted in a drum frame.
Figure 16:
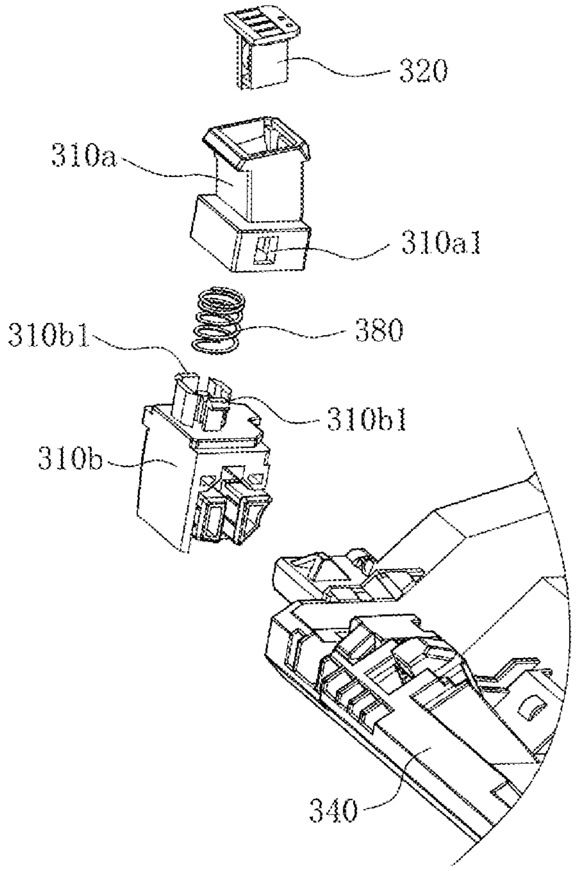
FIG. 16 is a schematic exploded view of the storage assembly according to Embodiment 2 of the present disclosure.

Next, Embodiment 2 of the present disclosure will be introduced with reference to FIGS. 15-16. Embodiment 2 provides a storage assembly, a mountable unit and a process cartridge. The same parts as those in Embodiment 1 described above will not be repeated in Embodiment 2, and the difference is that the structure of the storage unit mounting frame 310 in this embodiment is different from that in the aforementioned embodiment.

Specifically, the storage unit mounting frame 310 includes a first storage unit mounting frame **310*a* and a second storage unit mounting frame 310*b* which are separately disposed and connected to each other. The first storage unit mounting frame 310*a* supports the storage unit 320 or the electrical contact surface thereon, the second storage unit mounting frame 310*b* is mounted on the drum frame 340, and an elastic component 380 is connected between the first storage unit mounting frame 310*a* and the second storage unit mounting frame 310*b*, so that the first storage unit mounting frame 310*a* may be elastically moved relative to the second storage unit mounting frame 310*b*. Preferably, the elastic component 380 is a spring. Optionally, the elastic component 380 may also be a component having elasticity such as a sponge or an elastic sheet. When the drum cartridge A is mounted in the imaging device, the storage unit 320 is in contact with and pressed by the storage unit connector 99 of the imaging device, and then the first storage unit mounting frame 310*a* may be driven to move toward the second storage unit mounting frame 310*b*, so that the elastic component 380 is compressed and deformed to generate an elastic force, and the elastic force pushes the storage unit 320 to move toward the storage unit connector 99, thereby maintaining the elastic abutment between the storage unit 320 and the storage unit connector 99. This may not only effectively avoid the situation where the storage unit 320 and the storage unit connector 99 are damaged by hard contact during the installation process, but also avoid the situation where the actual installation position of the storage unit 320 deviates greatly from the correct installation position due to the manufacturing error of the storage unit mounting frame 310, resulting in the storage unit 320 being unable to be electrically connected to the storage unit connector 99 or the two interfering with each other during installation. The first storage unit mounting frame 310*a* is provided with a fastened portion 310*a*1 which is preferably a slide groove, and the second storage unit mounting frame 310*b* is provided with a fastening portion 310*b*1 which is preferably an elastic buckle. The fastening portion 310*b*1 may be fastened to the fastened portion 310*a*1. On the one hand, the first storage unit mounting frame 310*a* and the second storage unit mounting frame 310*b* may be connected to each other to prevent the two from being separated from each other; and on the other hand, the first storage unit mounting frame 310*a* may be moved relative to the second storage unit mounting frame 310*b* according to a predetermined moving route. Preferably, the fastened portion 310*a*1 and the fastening portion 310*b*1 are each provided in a pair. The pair of fastened portions 310*a*1 are relatively disposed on different walls of the first storage unit mounting frame 310*a*, and the pair of fastening portions 310*b*1 are relatively disposed on the second storage unit mounting frame 310*b*. By disposing the two relatively, it is advantageous to improve the movement stability of the storage unit mounting frame. Optionally, the slide groove is disposed on the second storage unit mounting frame 310*b*, and the elastic buckle is disposed on the first storage unit mounting frame 310*a*, which is opposite to the above embodiment. That is, the slide groove is provided on one of the first storage unit mounting frame 310*a* and the second storage unit mounting frame 310*b***, and the elastic buckle is provided on the other. It is not limited thereto.

Embodiment 3

Figure 17:
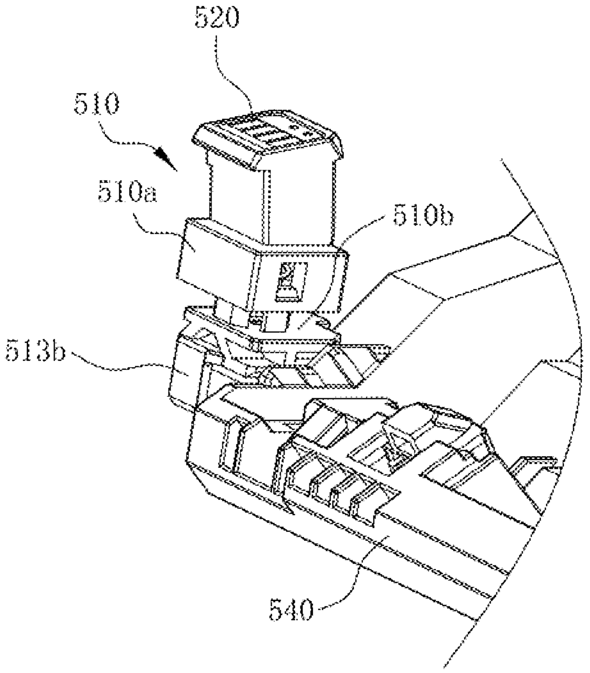
FIG. 17 is a schematic view of a storage assembly according to Embodiment 3 of the present disclosure that is mounted in a drum frame.
Figure 18:
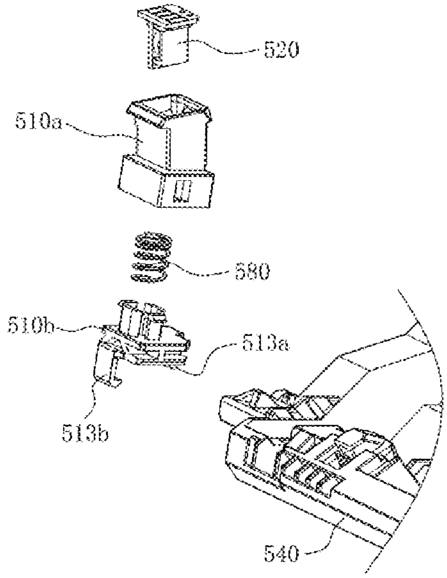
FIG. 18 is a schematic exploded view of the storage assembly according to Embodiment 3 of the present disclosure.

Next, Embodiment 3 of the present disclosure will be introduced with reference to FIGS. 17-18. Embodiment 3 provides a storage assembly, a mountable unit and a process cartridge. The same parts as those in Embodiments 1-2 described above will not be repeated in Embodiment 3, and the difference is that the structure of the storage unit mounting frame 510 in this embodiment is different from that in the aforementioned embodiments.

The storage unit mounting frame 510 also includes a first storage unit mounting frame **510*a* and a second storage unit mounting frame 510*b* which are separately disposed and connected to each other, wherein the first storage unit mounting frame 510*a* supports a storage unit 520 or an electrical contact surface thereon, the second storage unit mounting frame 510*b* is mounted on the drum frame 540, and an elastic component 580 is connected between the first storage unit mounting frame 510*a* and the second storage unit mounting frame 510*b*, so that the first storage unit mounting frame 510*a* may be elastically moved relative to the second storage unit mounting frame 510*b*. Moreover, the structure of the interconnection between the first storage unit mounting frame 510*a* and the second storage unit mounting frame 510*b* is similar to that of Embodiment 2, which will not be repeated here. The difference is that the positioning structure of the second storage unit mounting frame 510*b* mounted on the drum frame 540 is different. In this embodiment, the positioning structure of the second storage unit mounting frame 510*b* is similar to the positioning structure of the second storage unit mounting frame 510*b* in the aforementioned embodiments, that is, the second storage unit mounting frame 510*b* is provided with a pair of elastic buckles, a first elastic buckle 513*a* and a second elastic buckle 513*b*, spaced apart in the front-rear direction, and the two may be matched and buckled on the drum frame 540**, which will not be repeated here.

Embodiment 4

As shown in FIGS. 19-26, Embodiment 4 of the present disclosure provides a storage assembly, a mountable unit and a process cartridge. The process cartridge includes a developing cartridge 80 and a drum cartridge 10. The developing cartridge 80 and the storage assembly may both be detachably mounted in the drum cartridge 10, and the developing cartridge 80, the drum cartridge 10 and the storage assembly may be detachably mounted in an imaging device as a whole. Next, each of them will be described in detail.

Drum Cartridge

Figure 19:
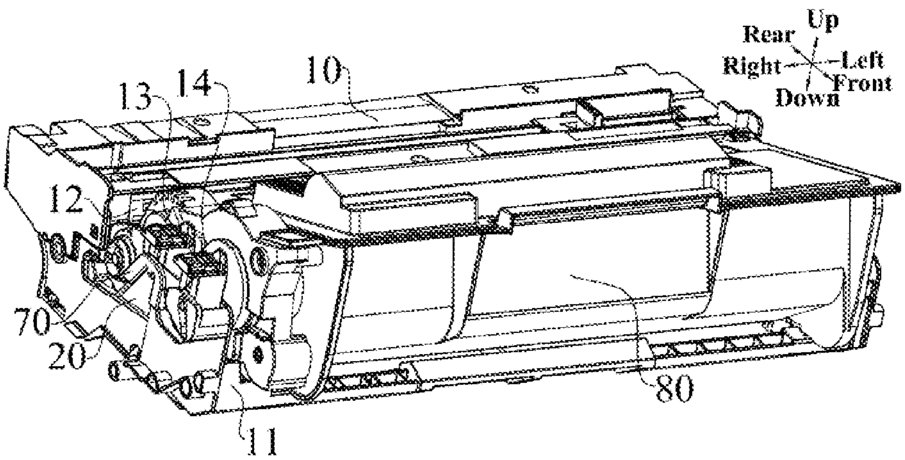
FIG. 19 is a schematic view of a storage assembly according to Embodiment 4 of the present disclosure in a state where it is mounted in a drum cartridge.
Figure 20:
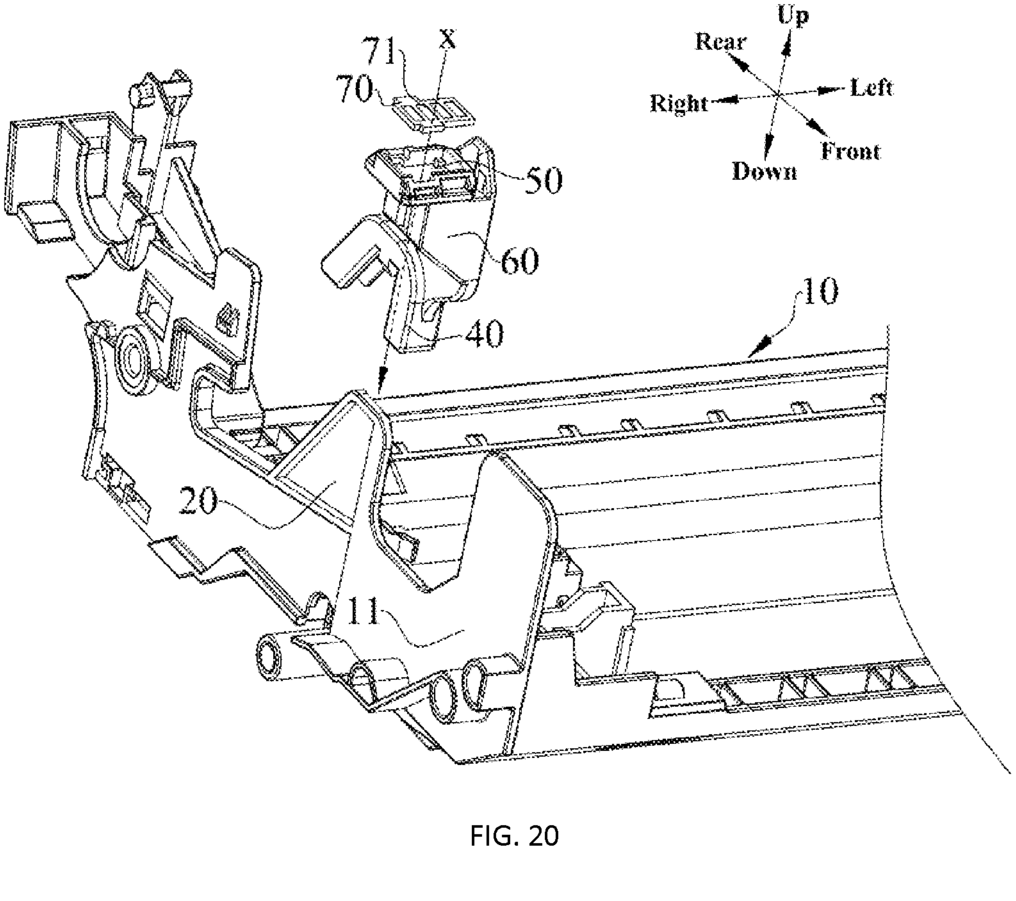
FIG. 20 is a schematic view of the storage assembly according to Embodiment 4 of the present disclosure that is mounted to the drum cartridge, from one angle.
Figure 21:
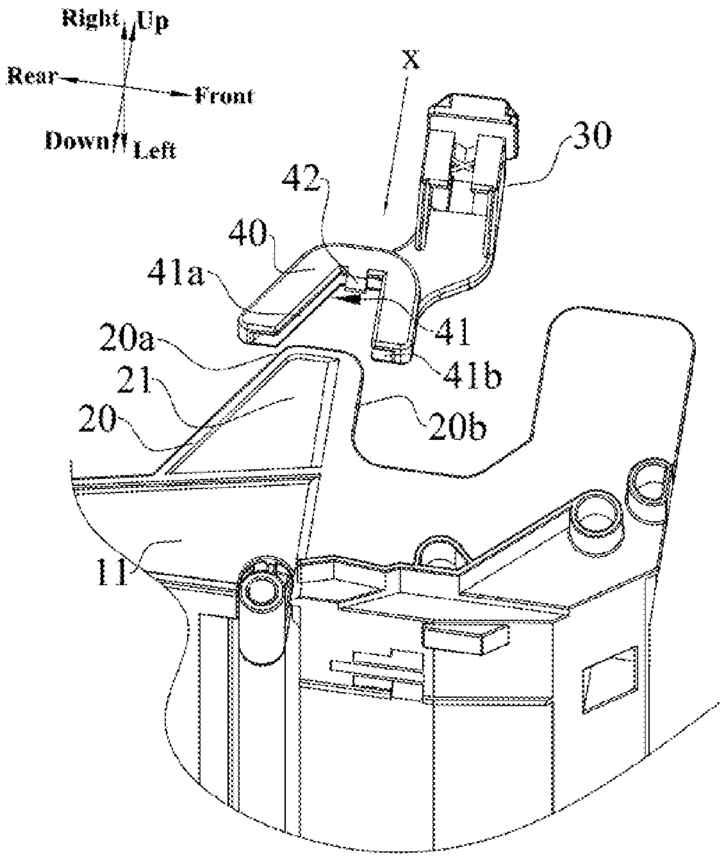
FIG. 21 is a schematic view of the storage assembly according to Embodiment 4 of the present disclosure that is mounted to the drum cartridge, from another angle.

As shown in FIGS. 19-21, the drum cartridge 10 includes a drum frame 11 for accommodating a developing cartridge 80, and a photosensitive drum 12 for forming an electrostatic latent image and a drum cartridge driving portion (not shown) capable of receiving a driving force of the imaging device to rotate the photosensitive drum 12 are rotatably supported on the front side of the drum frame 11. The photosensitive drum 12 may rotate about a photosensitive drum axis extending in the left-right direction. A drum cartridge storage 13 for storing drum cartridge information is provided on the rear side of the left end of the drum frame 11. The drum cartridge storage 13 has a drum cartridge electrical contact surface 14. An upwardly extending supporting portion 20 is provided on the left side of the drum frame 11. In the front-rear direction, the supporting portion 20 is located between the photosensitive drum 12 and the drum cartridge electrical contact surface 14. The supporting portion 20 is generally in a right-angled trapezoid. Two ends of the supporting portion 20 in the front-rear direction are a first supporting surface 20*a* and a second supporting surface 20*b*, respectively, and an inwardly recessed fixing portion 21 is provided on the right side of the supporting portion 20.

Storage Assembly

Figure 22:
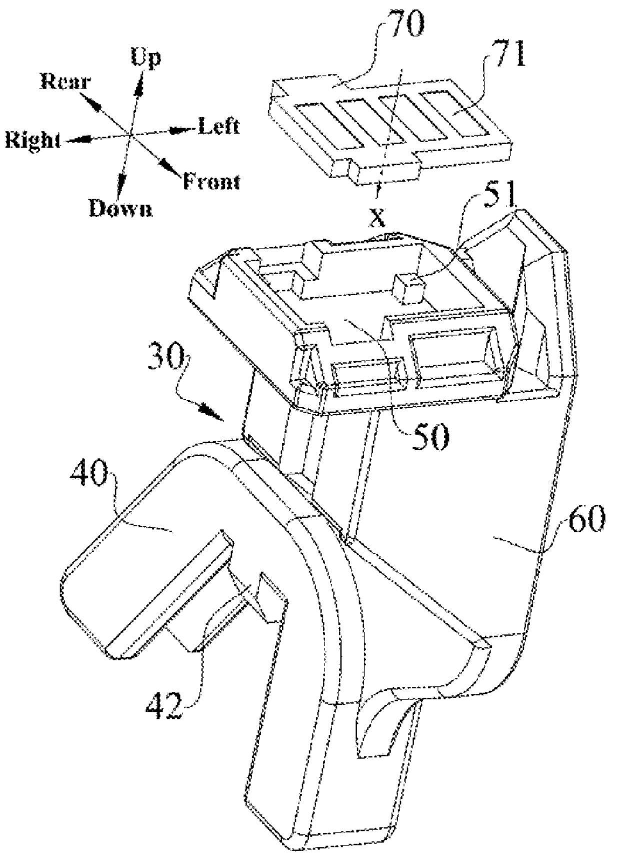
FIG. 22 is a schematic view of the storage assembly according to Embodiment 4 of the present disclosure that is mounted to a storage unit mounting frame, from one angle.

As shown in FIGS. 20-22, a storage assembly in this embodiment is shown. The storage assembly includes a storage unit mounting frame 30 and a storage unit 70 for storing information, such as model, of the developing cartridge 80. The storage unit 70 is provided with an electrical contact surface 71 for electrically contacting the imaging device. When the storage assembly is mounted in the drum cartridge 10, the electrical contact surface 71 is disposed at a position closer to the photosensitive drum axis in the front-rear direction than the drum cartridge electrical contact surface 14. The drum frame 11 is provided with a supporting surface, the storage unit mounting frame 30 is provided with a supported surface, and the supported surface may be supported by the supporting surface. The storage unit mounting frame 30 includes an engagement portion 40 for engagement with the supporting portion 20, a mounting groove 50 for mounting the storage unit 70, and a connecting portion 60 for connecting the engagement portion 40 and the mounting groove 50. The engagement portion 40 is configured in a right-angle trapezoid matched with the supporting portion 20. A groove 41 is provided at the bottom of the engagement portion 40, and two ends of the groove 41 in the front-rear direction are configured as a first groove 41*a* and a second groove 41*b*, respectively. The first groove 41*a* is adapted to the first supporting surface 20*a*, and the second groove 41*b* is adapted to the second supporting surface 20*b*. An elastic buckle 42 as a fastening portion is provided below the left side of the engagement portion 40, and the elastic buckle 42 is used to buckle the supporting portion 20. A protrusion 51 for supporting the storage unit 70 is provided inside the mounting groove 50. One end of the connecting portion 60 close to the mounting groove 50 in the left-right direction protrudes in a direction away from the drum cartridge 10 to prevent the storage unit mounting frame 30 from interfering with the developing cartridge 80.

Process of Mounting Storage Unit Mounting Frame to Drum Cartridge

Figure 23:
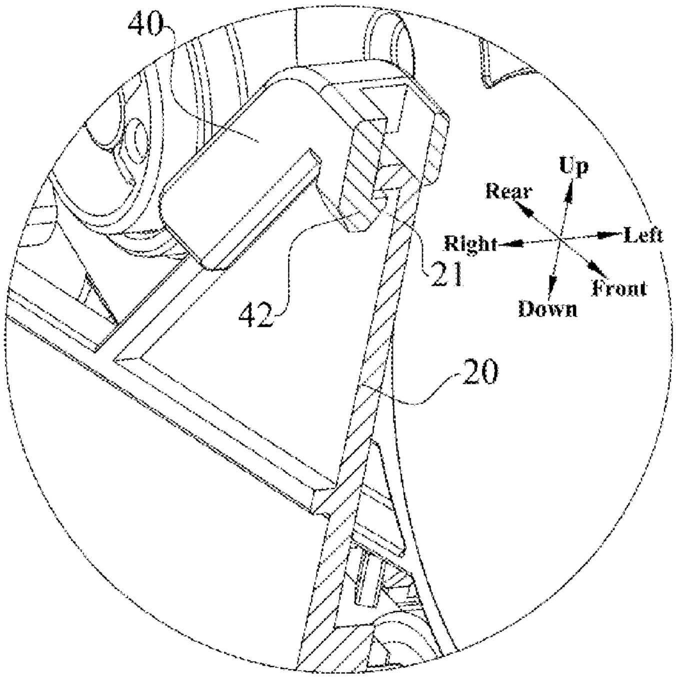
FIG. 23 is a schematic view of a longitudinal section structure of an engagement portion in a state where a storage unit mounting frame is mounted in a drum cartridge, according to Embodiment 4 of the present disclosure.
Figure 24:
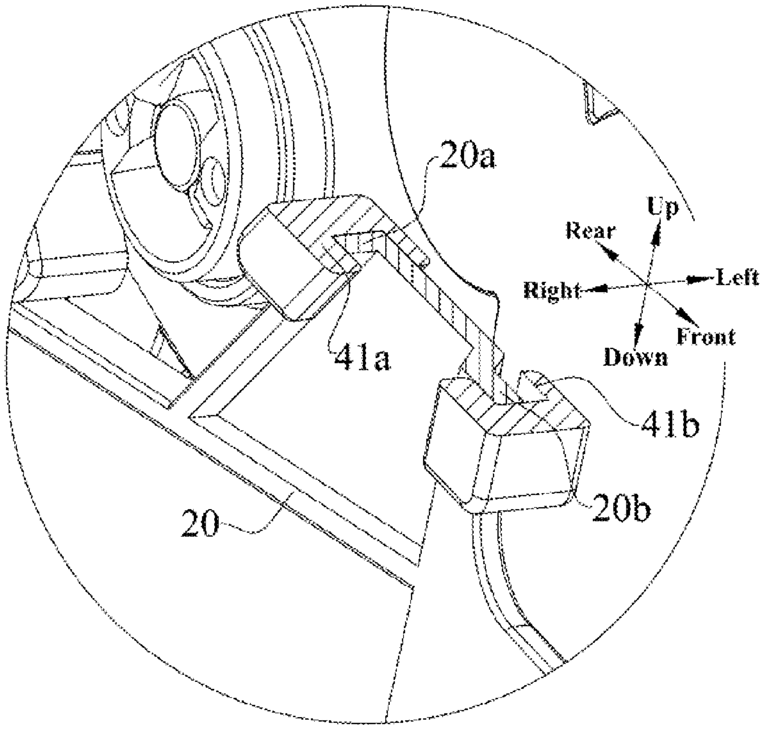
FIG. 24 is a schematic view of a transverse section structure of the engagement portion in the state where the storage unit mounting frame is mounted in the drum cartridge, according to Embodiment 4 of the present disclosure.
Figure 25:
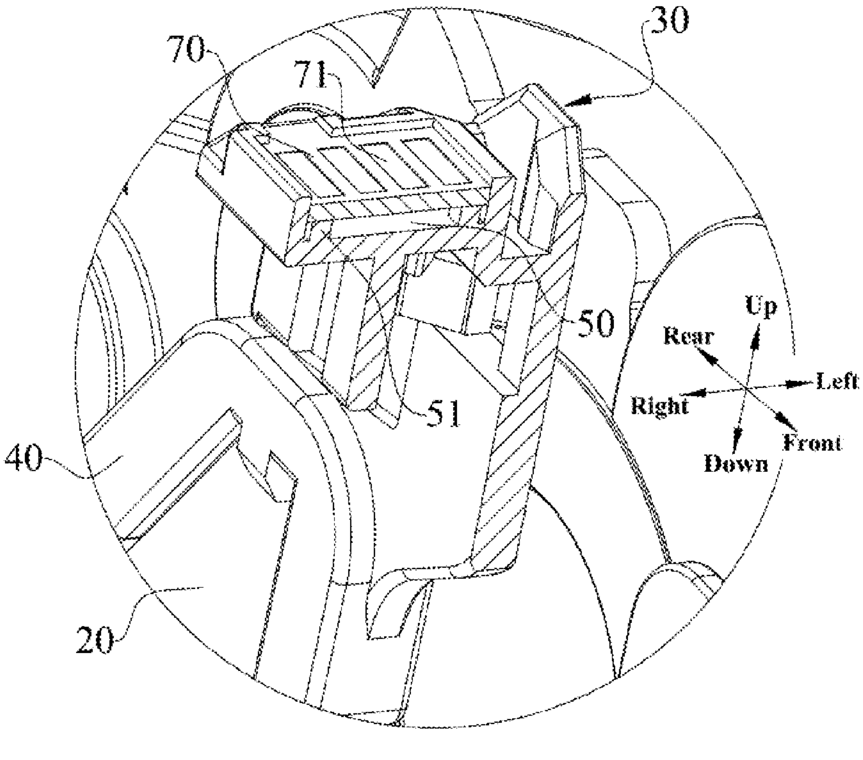
FIG. 25 is a schematic view of a longitudinal section structure of a mounting groove in the state where the storage unit mounting frame is mounted in the drum cartridge, according to Embodiment 4 of the present disclosure.
Figure 26:
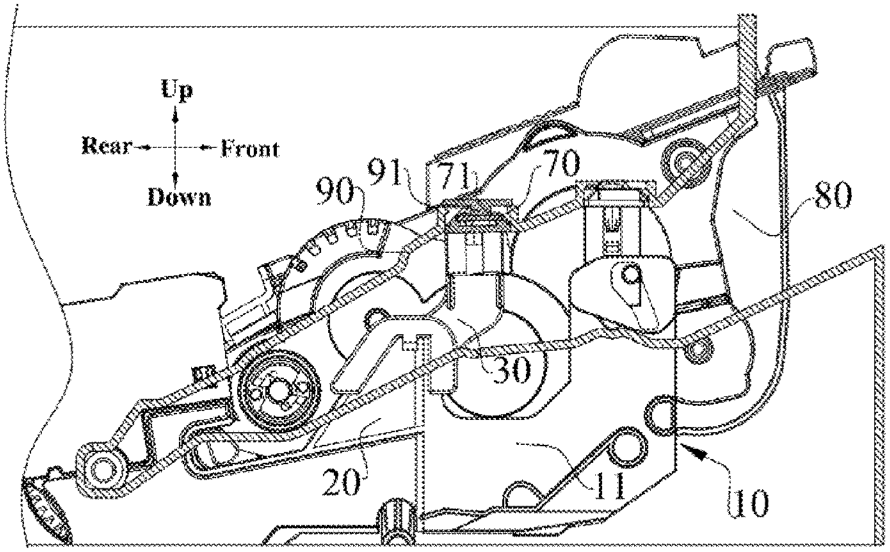
FIG. 26 is a partial side view of a guide frame in a state where the drum cartridge is mounted in an imaging device, according to Embodiment 4 of the present disclosure.

As shown in FIG. 20, before using the imaging device, the user needs to mount the developing cartridge 80 and the storage assembly to the drum cartridge 10, and mount the drum cartridge 10 in the imaging device for imaging operation for use. In order to complete the installation of the storage unit mounting frame 30, in the production link of the storage unit mounting frame 30, the user mounts the storage unit 70 inside the mounting groove 50 by an adhesive. After the user takes the storage unit mounting frame 30 with the storage unit 70 mounted, as shown in FIGS. 20-21, the first groove 41*a* of the engagement portion 40 is aligned with the first supporting surface 20*a* of the supporting portion 20 in the up-down direction of the drum cartridge 10, while the second groove 41*b* is aligned with the second supporting surface 20*b*. As shown in FIG. 21, after the alignment is completed, the user pushes the storage unit mounting frame 30 downward so that the engagement portion 40 is sleeved on the outer edge surface of the supporting portion 20 through the groove 41. As shown in FIG. 23, in the process of the storage unit mounting frame 30 being pushed downward, the elastic buckle 42 abuts against the supporting portion 20, and is deformed in the left-right direction under the continuous action of the pushing force, so that the elastic buckle 42 enters the interior of the fixing portion 21, thereby preventing the storage unit mounting frame 30 from disengaging.

Separation of Storage Unit Mounting Frame and Drum Cartridge

When the storage unit 70 needs to be replaced, the user only needs to pull up the storage unit mounting frame 30. The elastic buckle 42 located on one side of the engagement portion 40 is subjected to an upward pulling force and deformed to the left, thereby causing the engagement portion 40 to disengage from the supporting portion 20. Thereafter, the storage unit mounting frame 30 moves from bottom to top under the action of the pulling force, thereby completing the separation of the storage unit 70 from the drum cartridge 10.

Connection Between Storage Unit and Imaging Device

As shown in FIGS. 21-22, when mounting the storage unit 70, the user places the storage unit 70 to the interior of the mounting groove 50 from an X direction in the figures, and the storage unit 70 is fixedly connected to the mounting groove 50 by an adhesive. The storage unit 70 is fixed to the interior of the mounting groove 50 through the protrusion 51 provided inside the mounting groove 50, and the position of the storage unit 70 is limited under the support of the protrusion 51, thereby ensuring that the storage unit 70 has a stable electrical connection with the imaging device through an electrical contact surface 71.

A guide frame 90 for fixing the drum cartridge 10 is provided on one side of the interior of the imaging device, and a storage unit connector 91 is provided above the guide frame 90. When in use, the user installs the drum cartridge 10 together with the storage unit mounting frame 30 having the storage unit 70 mounted into the interior of the imaging device under the guidance of the guide frame 90. After entering the interior of the imaging device, the electrical contact surface 71 located on the top of the storage unit 70 is in contact with the storage unit connector 91 inside the imaging device, thereby forming an electrical connection. The imaging device may read and store the information of the storage unit 70.

Embodiment 5

As shown in FIGS. 27-36, a chip assembly 610 and a developing cartridge 100 that may be mounted in an imaging device 1 of the prior art are shown. The chip assembly 610 includes a chip holder 620 and a chip 630. The chip 630 is used to store information of the developing cartridge 100 and/or the drum cartridge (not shown). The developing cartridge 100 may be mounted in the drum cartridge in a detachable manner and mounted in an accommodating portion 2 of the imaging device 1 together with the drum cartridge. The imaging device 1 further includes a chip mounting groove 3 located on one side of the accommodating portion 2 in a first direction, and the chip mounting groove 3 is provided with an electrical contact head 4 on one side in a second direction. The electrical contact head 4 is electrically connected to a control system inside the imaging device 1. Next, each of them will be described in detail.

Figure 27:
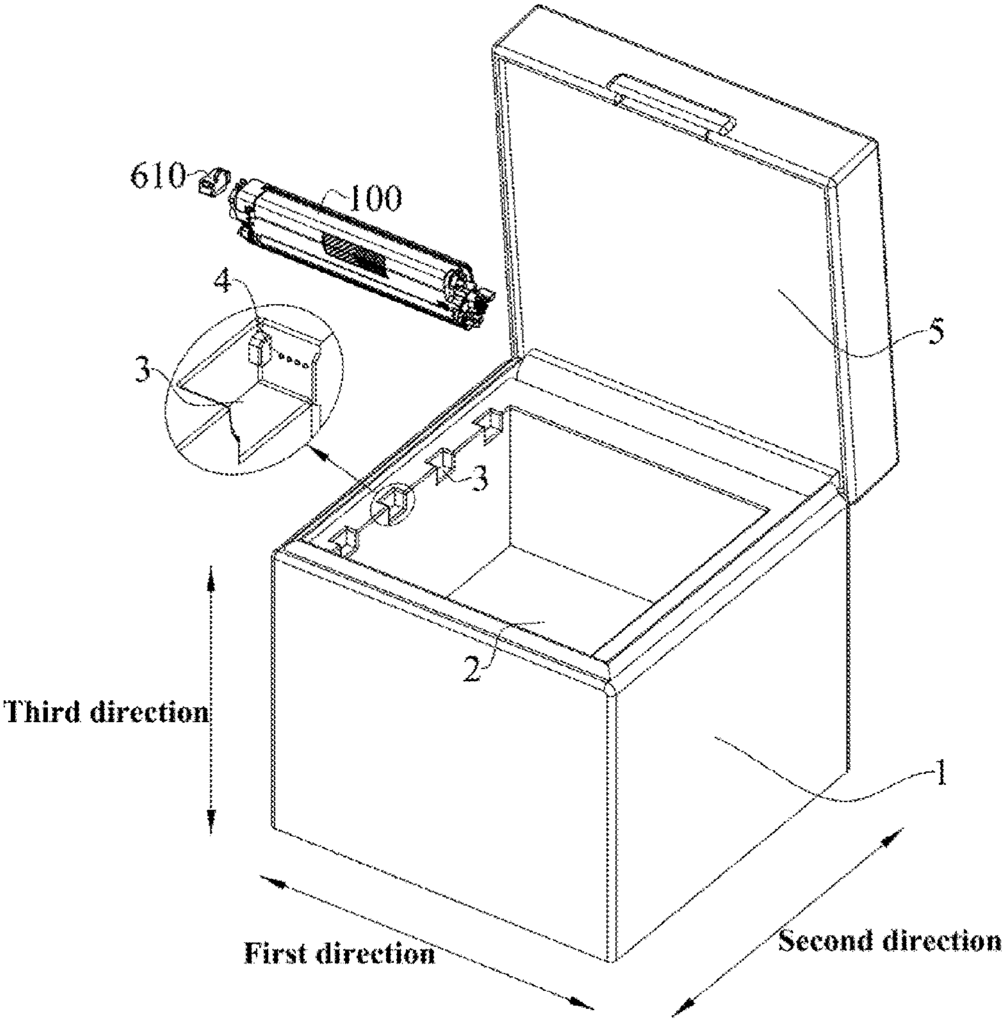
FIG. 27 is a schematic view of a chip assembly and a developing cartridge that are ready to be mounted in an electrophotographic imaging device, according to Embodiment 5 of the present disclosure.

FIG. 27 shows a schematic view of the chip assembly 610 and the developing cartridge 100 being mounted in the imaging device 1. The developing cartridge 100 and the chip assembly 610 may each be mounted to the imaging device 1 independently. Specifically, the developing cartridge 100 may be mounted to the interior of the accommodating portion 2 in the imaging device 1, and the chip assembly 610 may be mounted to the chip mounting groove 3 located on one side of the accommodating portion 2. In order to facilitate the following description of the structural layout of the present disclosure, as shown in FIG. 27, in a state where the developing cartridge 100 and the chip assembly 610 are mounted to the imaging device 1, the length direction of the developing cartridge 100 is the first direction, the length direction of the chip assembly 610 is the second direction, and a third direction intersects the first direction and the second direction. Preferably, the first direction, the second direction and the third direction are perpendicular to each other. Further, in order to further clarify the direction of each structure, the left-right direction shown in FIG. 27 serves as the first direction, the front-rear direction serves as the second direction, and the up-down direction serves as the third direction, which is used as an example for explanation. Specifically, the chip mounting groove 3 is located on the left side of the accommodating portion 2 in the first direction, the electrical contact head 4 is located in front of the chip mounting groove 3, and an outer cover 5 is located above the accommodating portion 2.

Figure 28:
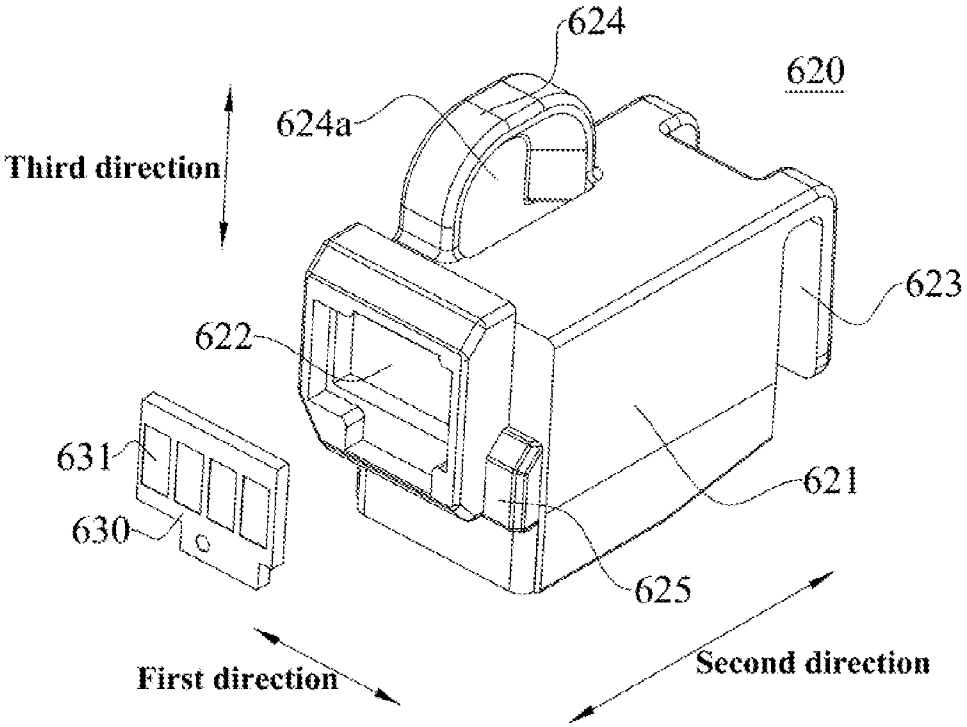
FIG. 28 is a schematic exploded view of the chip assembly according to Embodiment 5 of the present disclosure.
Figure 36:
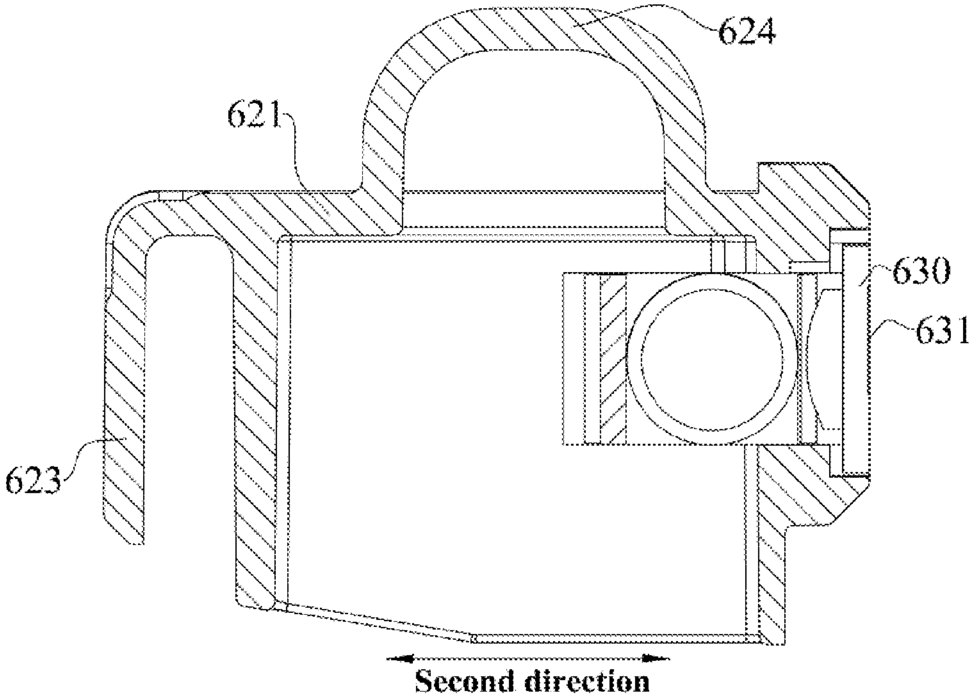
FIG. 36 is a cross-sectional view of the chip assembly according to Embodiment 5 of the present disclosure in the second direction.
Figure 37:
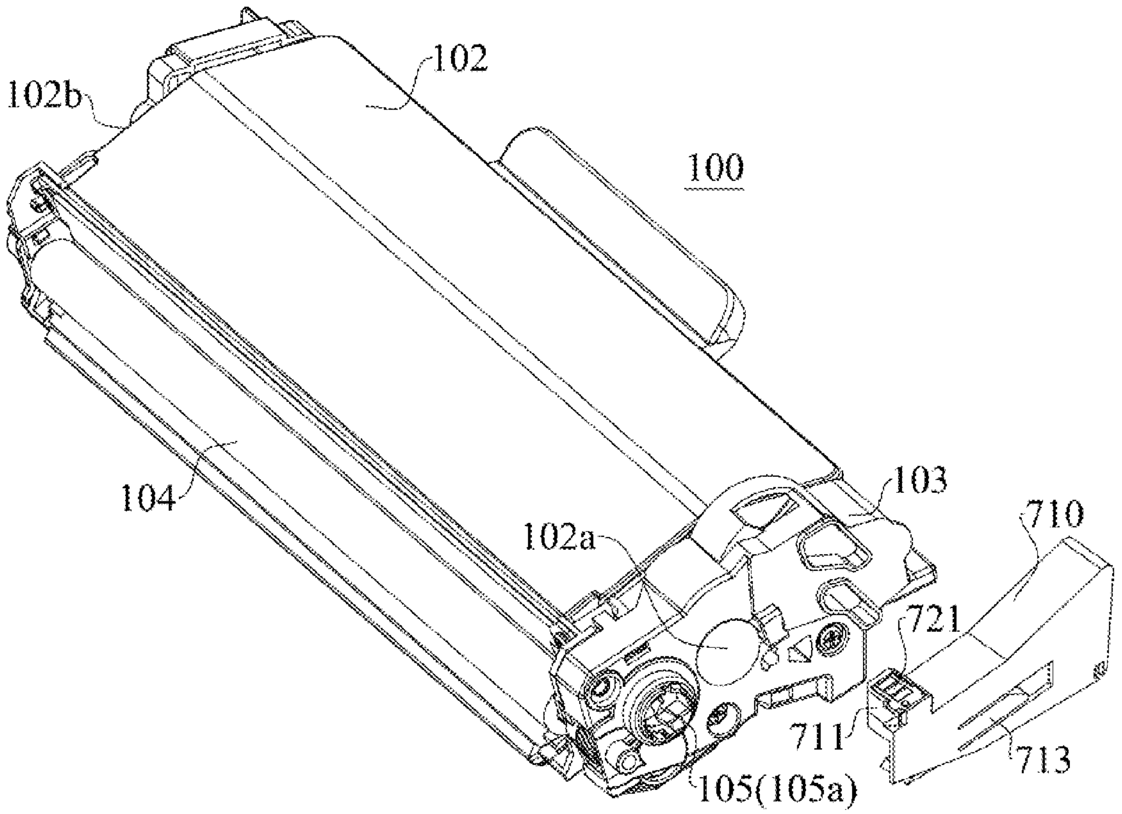
FIG. 37 is a schematic view of a three-dimensional structure of a developing cartridge and a storage assembly according to Embodiment 6 of the present disclosure.
Figure 38:
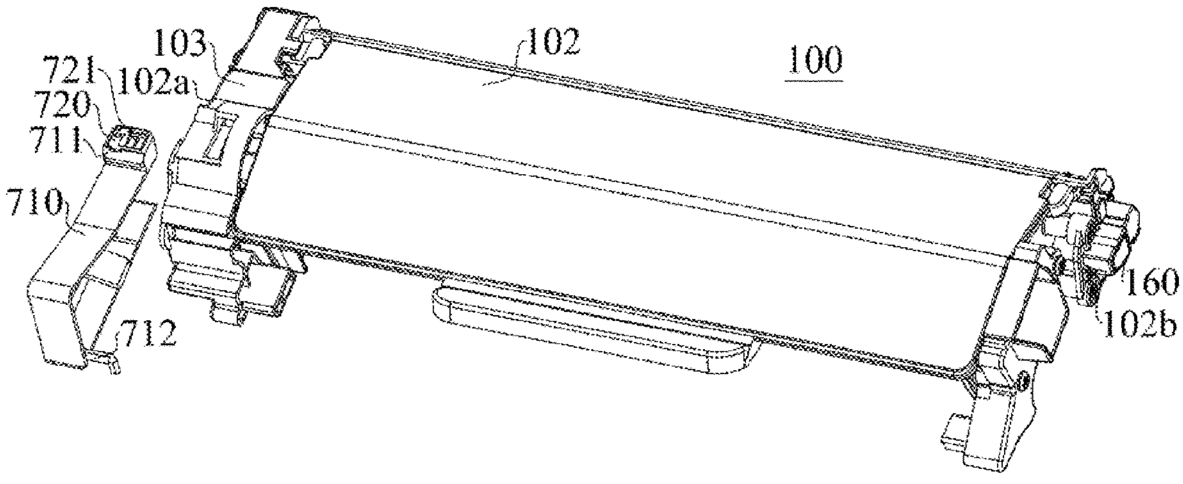
FIG. 38 is a schematic view of a three-dimensional structure of the developing cartridge and the storage assembly according to Embodiment 6 of the present disclosure from another angle.

As shown in FIG. 28, a chip holder 620 is shown. The chip holder 620 is used to support and fix a chip 630, while the chip holder 620 is mounted to the imaging device 1 together with the chip 630. Specifically, the chip holder 620 can be mounted in the chip mounting groove 3 of the imaging device 1 in a detachable manner, and the chip holder 620 includes a main body portion 621, a chip accommodating portion 622, an elastic portion 623, a gripping portion 624, and a limited portion 625. The chip accommodating portion 622 is located on one side of the chip holder 620 in the second direction, the chip accommodating portion 622 is used to accommodate the chip 630, and an electrical contact surface 631 of the chip 630 is exposed on one side of the chip holder 620 in the second direction. The elastic portion 623 is located on the other side of the chip holder 620 in the second direction (as shown in FIG. 36). When the chip assembly 610 is mounted in the chip mounting groove 3 of the imaging device 1, due to the size limitation of the chip mounting groove 3, and due to the size limitation between a first abutting surface 3*a*, a second abutting surface 3*b* and a third abutting surface 3*c* in the chip mounting groove 3 and the electrical contact head 4, the elastic portion 623 is deformed to generate an elastic force. The elastic force pushes the chip holder 620 to move in a direction close to the electrical contact head 4, and the electrical contact surface 631 moves along with the chip holder 620 in the second direction toward the side close to the electrical contact head 4, so that the electrical contact surface 631 is in contact with the electrical contact head 4 to form a stable electrical connection. The gripping portion 624 is disposed on one side of the chip holder 620 in the third direction. The gripping portion 624 is formed by extending upward in the third direction from above the main body portion 621 of the chip holder 620. A recess 624*a* is disposed on one side of the gripping portion 624 in the first direction to facilitate the user's gripping. In the third direction, the distance between the end of the gripping portion 624 away from the main body portion 621 and the main body portion 621 is G. In order to avoid interference between the gripping portion 624 and the outer cover 5 of the imaging device 1, G≤9 mm, preferably, 3 mm≤G≤8 mm.

Further, the length of the chip mounting groove 3 in the second direction decreases from top to bottom in the third direction, that is, the length C1 of the upper part of the chip mounting groove 3 in the second direction is greater than the length C2 of the lower part of the chip mounting groove 3 in the second direction, and the initial length L of the chip assembly 610 in the second direction satisfies C1≤L≤C2. When the chip assembly 610 is mounted in the chip mounting groove 3 of the imaging device 1, due to the size limitation of the chip mounting groove 3, and due to the size limitation between the first abutting surface 3*a*, the second abutting surface 3*b* and the third abutting surface 3*c* in the chip mounting groove 3 and the electrical contact head 4, the elastic portion 623 is deformed to generate an elastic force. The elastic force pushes the chip holder 620 to move in the direction close to the electrical contact head 4, so that the electrical contact surface 631 is in closer contact with the electrical contact head 4, thereby ensuring the stability of the electrical connection between the electrical contact surface 631 and the electrical contact head 4. Specifically, in this embodiment, C1 may be set to 31 mm to 32 mm, C2 may be set to 24 mm to 25 mm, and the value range of L is 25 mm≤L≤31 mm. Preferably, in this embodiment, the elastic portion 623 is configured as an elastic plastic sheet, and the elastic portion 623 may be integrally formed with the main body portion 621 to reduce the production cost of the chip assembly 610.

The limited portion 625 is located on one side of the chip holder 620 in the first direction, and the limited portion 625 is configured as a limiting protrusion extending in the second direction and the third direction. The limited portion 625 may cooperate with the limiting protrusion 31 disposed on one side of the interior of the chip mounting groove 3 to limit the movement of the chip holder 620 in the third direction.

Figure 29:
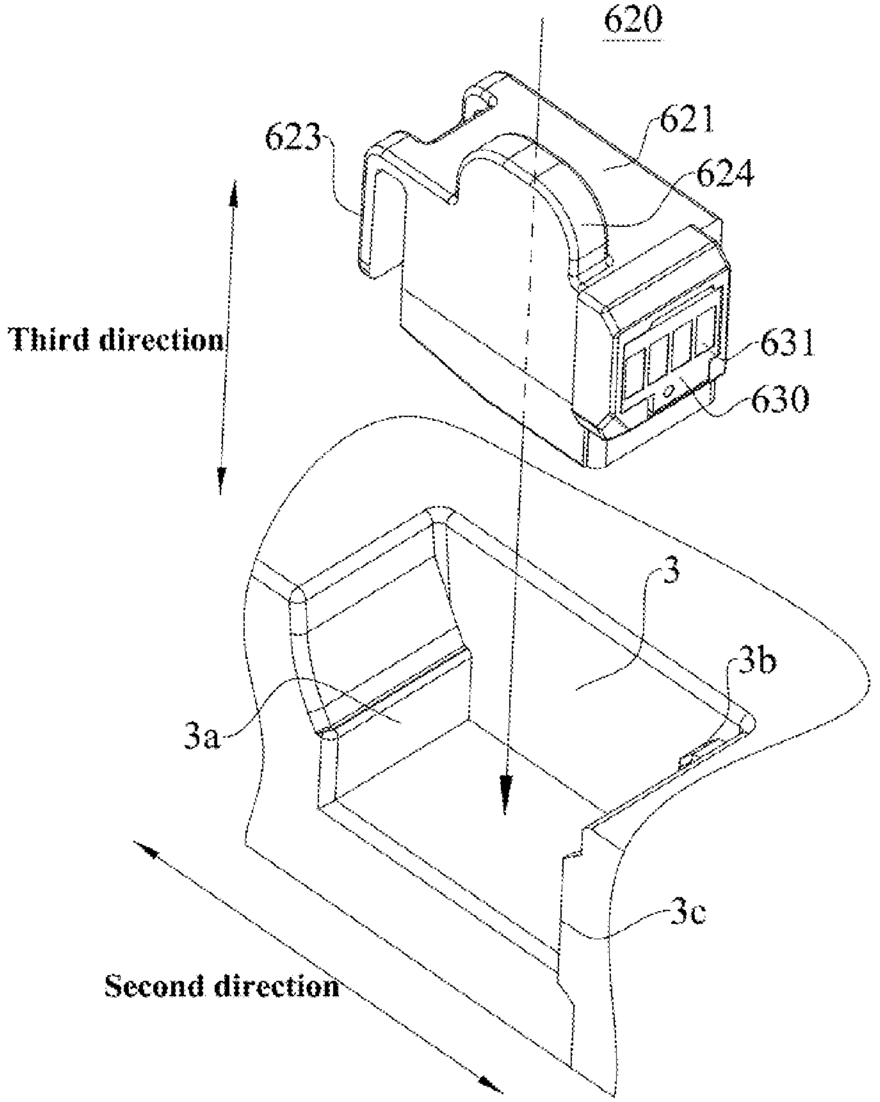
FIG. 29 is a schematic view of the chip assembly according to Embodiment 5 of the present disclosure that is ready to be mounted in a chip mounting groove.
Figure 30:
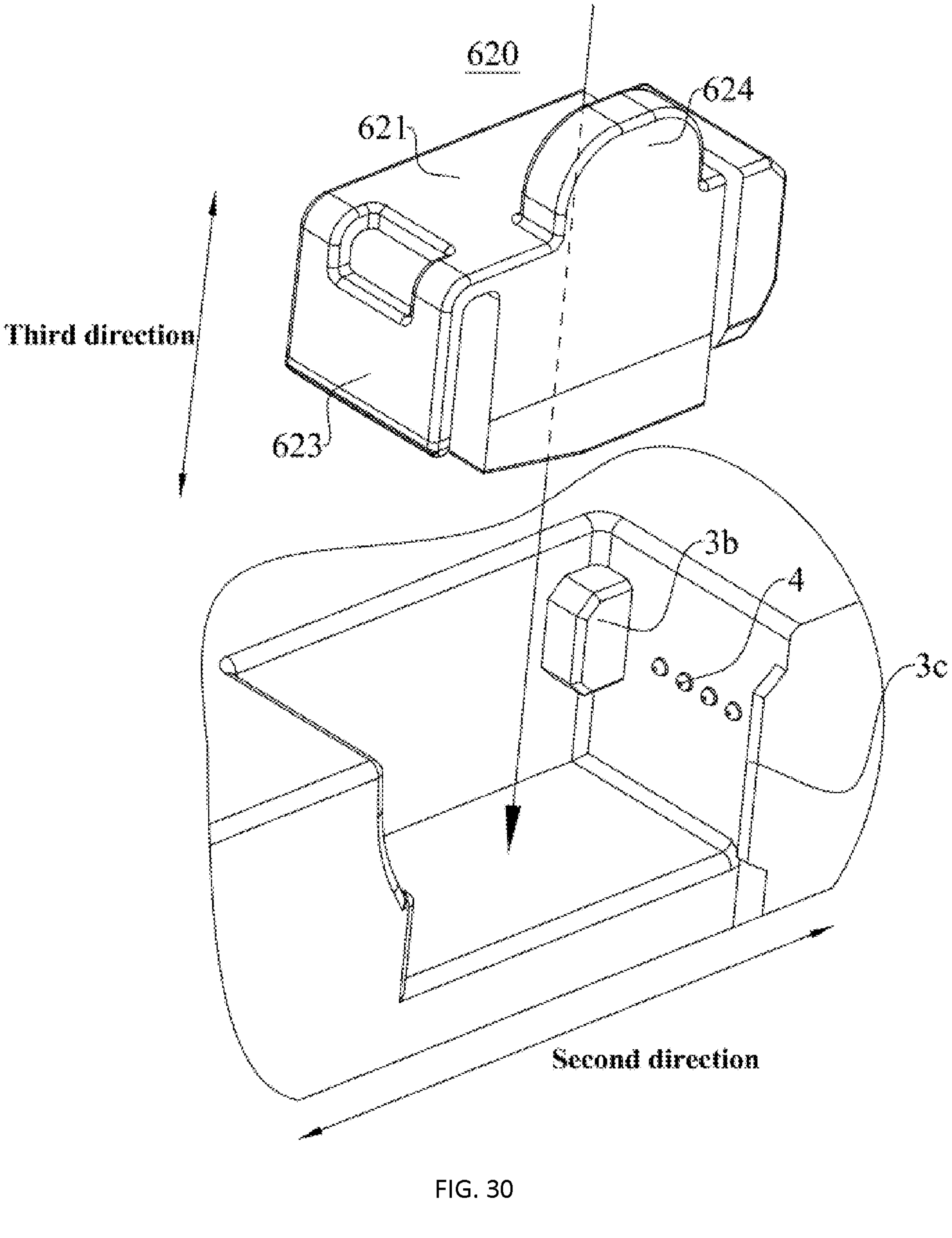
FIG. 30 is a schematic view of the chip assembly according to Embodiment 5 of the present disclosure that is ready to be mounted in the chip mounting groove, from another angle.
Figure 31:
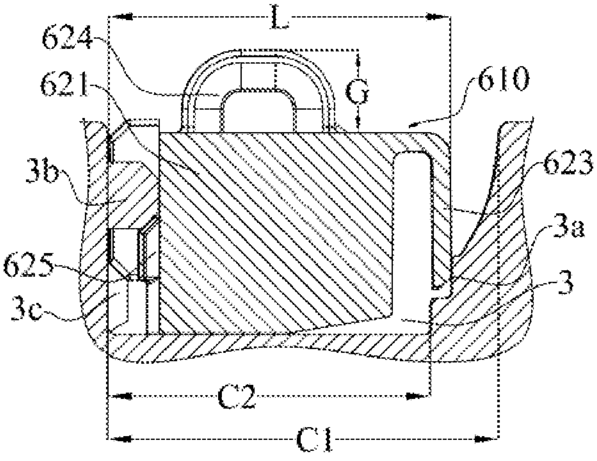
FIG. 31 is a schematic view of a side section structure of the chip assembly according to Embodiment 5 of the present disclosure in a state where it is engaged with the chip mounting groove.
Figure 32:
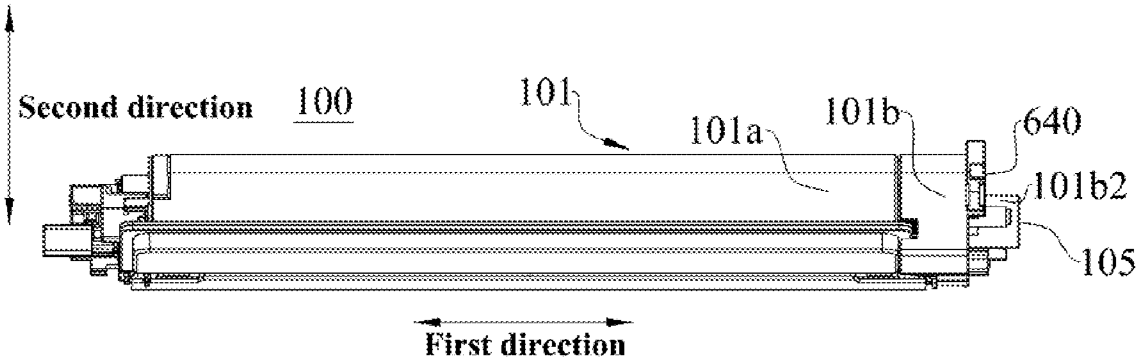
FIG. 32 is a schematic structural view of the developing cartridge according to Embodiment 5 of the present disclosure when viewed along a third direction.
Figure 33:
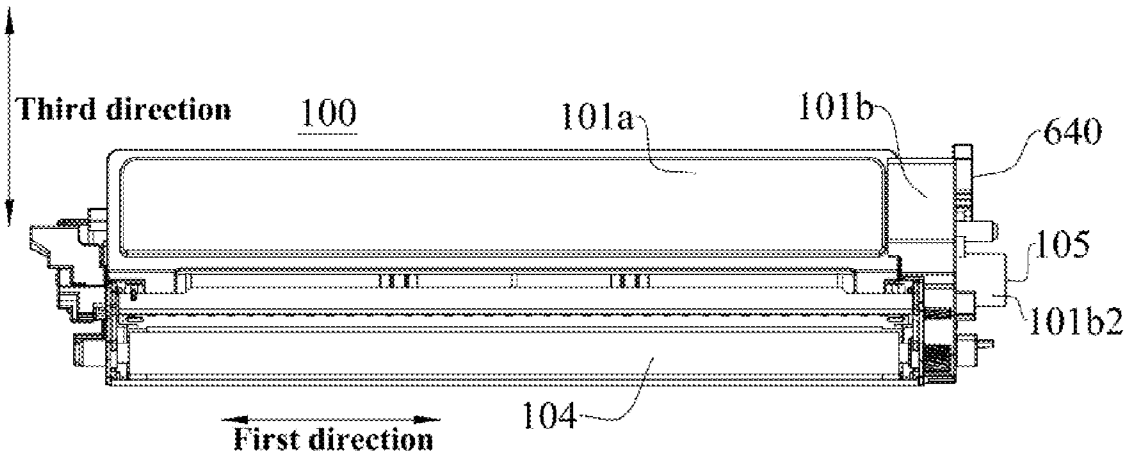
FIG. 33 is a schematic structural view of the developing cartridge according to Embodiment 5 of the present disclosure when viewed along a second direction.
Figure 34:
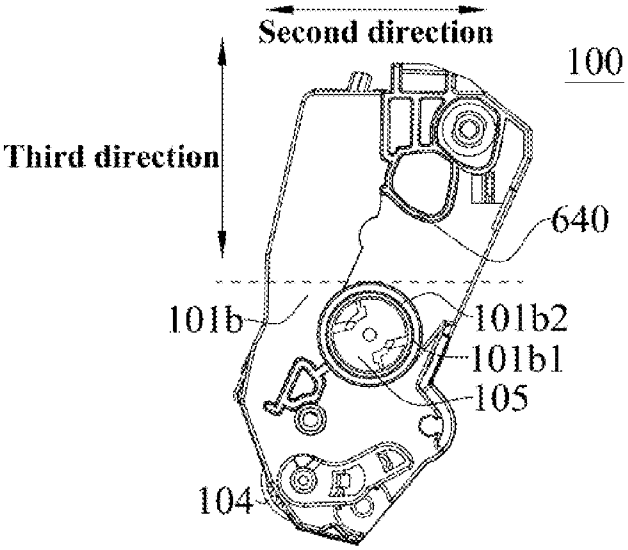
FIG. 34 is a schematic structural view of the developing cartridge according to Embodiment 5 of the present disclosure when viewed along a first direction.
Figure 35:
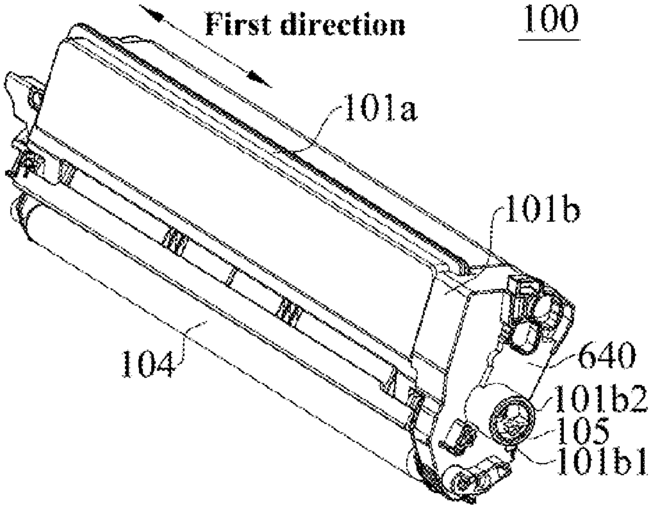
FIG. 35 is a schematic view of a three-dimensional structure of the developing cartridge according to Embodiment 5 of the present disclosure from one angle.

The process of mounting the chip assembly 610 to the imaging device 1 and the relationship between the chip assembly 610 and the developing cartridge 100 in a mounted state will be described in detail below with reference to FIGS. 29 to 31. During production, the manufacturing personnel fix and mount the chip 630 inside the chip accommodating portion 622 by means of snapping or gluing, and expose the electrical contact surface 631 on one side of the chip holder 620 in the second direction.

During installation and use, the user first opens the outer cover 5 of the imaging device 1 and takes out the original developing cartridge 100 and the drum cartridge. Then, the user moves the chip assembly 610 to the upper part of the chip mounting groove 3 in the imaging device 1 in the third direction by holding the gripping portion 624 of the chip holder 620. Thereafter, the user aligns the chip assembly 610 with the chip mounting groove 3 and moves the chip holder 620 downward to the interior of the chip mounting groove 3. During the process of mounting the chip holder 620 to the chip mounting groove 3, the user applies a downward thrust force to the chip holder 620 in the third direction, and the elastic portion 623 of the chip holder 620 abuts against the abutting surface 3*a* of the chip mounting groove 3 to receive an abutting force exerted on the elastic portion 623 of the chip holder 620 by the side wall of the chip mounting groove 3 in the second direction. Under the action of the thrust force and the abutting force, the elastic portion 623 is deformed to accumulate elastic force. At this time, under the action of the elastic force, the chip holder 620 moves in the second direction toward the side close to the electrical contact head 4, so that the electrical contact surface 631 of the chip 630 is in contact with the electrical contact head 4. Moreover, under the action of the elastic force provided by the elastic portion 623, the chip holder 620 maintains a tendency to move in the second direction toward the side close to the electrical contact surface 631, so as to maintain the contact between the electrical contact surface 631 and the electrical contact head 4, thereby making the electrical connection of the chip 620 and the imaging device 1 more stable.

As shown in FIGS. 32-35, the developing cartridge 100 includes a casing 101 for accommodating developer. The casing 101 has a first side and a second side separated from each other in the first direction. The casing 101 includes a casing main body 101*a* and a protective cover 101*b* mounted on the casing main body 101*a* near the first side of the casing 101 in a detachable manner. The protective cover 101*b* is used to cover a gear train located on the first side of the casing 101. The gear train includes but is not limited to a coupling gear 105. The coupling gear 105 is located on the first side of the casing 101, and the coupling gear 105 may be connected to a driving member (not shown) inside the imaging device 1 to receive the driving force of the imaging device 1 and rotate about a coupling gear axis extending in the first direction. The coupling gear 105 may drive the developing roller 104, a supply roller and the agitator to rotate about their respective axes extending in the first direction. In a state where the chip assembly 610 and the developing cartridge 100 are both mounted to the imaging device 1, the chip assembly 610 is located at one end of the developing cartridge 100 near the first side of the casing 101. The protective cover 101*b* is provided with a through hole 101*b*1 that exposes the coupling gear 105 in the first direction and a hole wall 101*b*2 that forms the through hole 101*b*1. The hole wall 101*b*2 and/or the coupling gear 105 are located at the endmost end of the developing cartridge 100 close to the first side in the first direction. It is worth noting that, in order to enable both the chip holder 620 and the developing cartridge 100 to be smoothly mounted to the imaging device 1, a side of the protective cover 102 in the developing cartridge 100 is provided with an avoidance surface 640, and the avoidance surface 640 is configured as the end of at least a part of the developing cartridge 100 in the first direction. When the developing cartridge 100 and the chip assembly 610 are mounted to the imaging device 1 together, the avoidance surface 640 overlaps with at least a part of the chip assembly 610 when viewed along the first direction, so as to prevent the developing cartridge 100 from interfering with the chip assembly 610 in the state where the chip assembly 610 and the developing cartridge 100 are mounted to the imaging device 1. Specifically, the avoidance surface 640 is farther away from the developing roller 104 than the coupling gear 105 in the third direction, and is closer to the second side of the developing cartridge 100 than the left end of the coupling gear 105 and/or the hole wall 101*b*2 in the first direction.

The present disclosure further provides a combination of the aforementioned chip assembly 610 and the aforementioned developing cartridge 100. The chip assembly 610 and the developing cartridge 100 are disposed independently of each other. The chip assembly 610 and the developing cartridge 100 may be separately mounted to the imaging device 1 for use. After the service life of the developing cartridge 100 is exhausted, it only needs to be replaced with a new developing cartridge 100 for continued use, and there is no need to replace the chip assembly 100 together, thereby reducing the use cost of the developing cartridge 100.

Embodiment 6

As shown in FIGS. 37-44, a storage assembly 710, a developing cartridge 100 and a drum cartridge 50 are shown. The developing cartridge 100 can be mounted to the drum cartridge 50 in a detachable manner. The developing cartridge 100, the drum cartridge 50 and the storage assembly 710 can be mounted to the imaging device in a detachable manner. The storage assembly 710 and the developing cartridge 100 are disposed independently of each other. The imaging device includes an accommodating portion (not shown) for mounting on the developing cartridge 100, and a chip mounting portion located on one side of the accommodating portion in the left-right direction. The chip mounting portion is provided with an electrical contact head on the upper part in the up-down direction. The electrical contact head is electrically connected to a control system inside the imaging device. Next, each of them will be described in detail.

The developing cartridge 100 includes a casing 102 capable of accommodating developer, and a developing roller 104 that is rotatably supported on the casing 102. The casing 102 has a first side surface 102*a* and a second side surface 102*b* in the left-right direction. A left protective cover 103 is provided on the driving side of the developing cartridge 100. The left protective cover 103 is used to protect the gear train. The gear train includes a coupling gear 105. The coupling gear 105 includes a coupling portion 105*a*. In the state where the developing cartridge 100 is mounted to the imaging device, the coupling portion 105*a* may be connected to a driving member inside the imaging device to receive the driving force of the imaging device and drive the developing roller 104 to rotate about the developing roller axis extending in the left-right direction. The coupling portion 105*a* is located on the first side surface 102*a* of the casing 102 in the left-right direction.

The developing cartridge 100 further includes an electrode. The electrode has an electrode contact portion 160. The electrode is located on the second side surface 102*b* in the left-right direction, and the electrode contact portion 160 is exposed on the second side surface 102*b* in the left-right direction. In the state where the developing cartridge 100 is mounted to the imaging device, the electrode contact portion 160 is in contact with a power supply member inside the imaging device to receive power from the imaging device. The electrode transmits the power to a developer conveying member inside the developing cartridge 100, and the developer conveying member is, for example, the developing roller 104.

Figure 43:
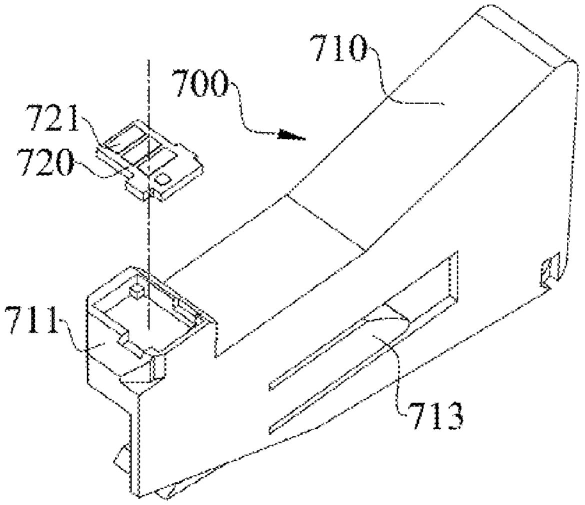
FIG. 43 is a schematic exploded view of a holder and a chip being mounted in the storage assembly according to Embodiment 6 of the present disclosure.
Figure 44:
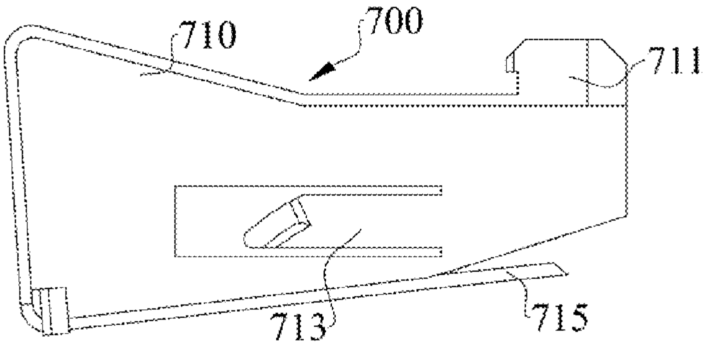
FIG. 44 is a schematic view of a right side structure of the storage assembly according to Embodiment 6 of the present disclosure a left and right direction.
Figure 45:
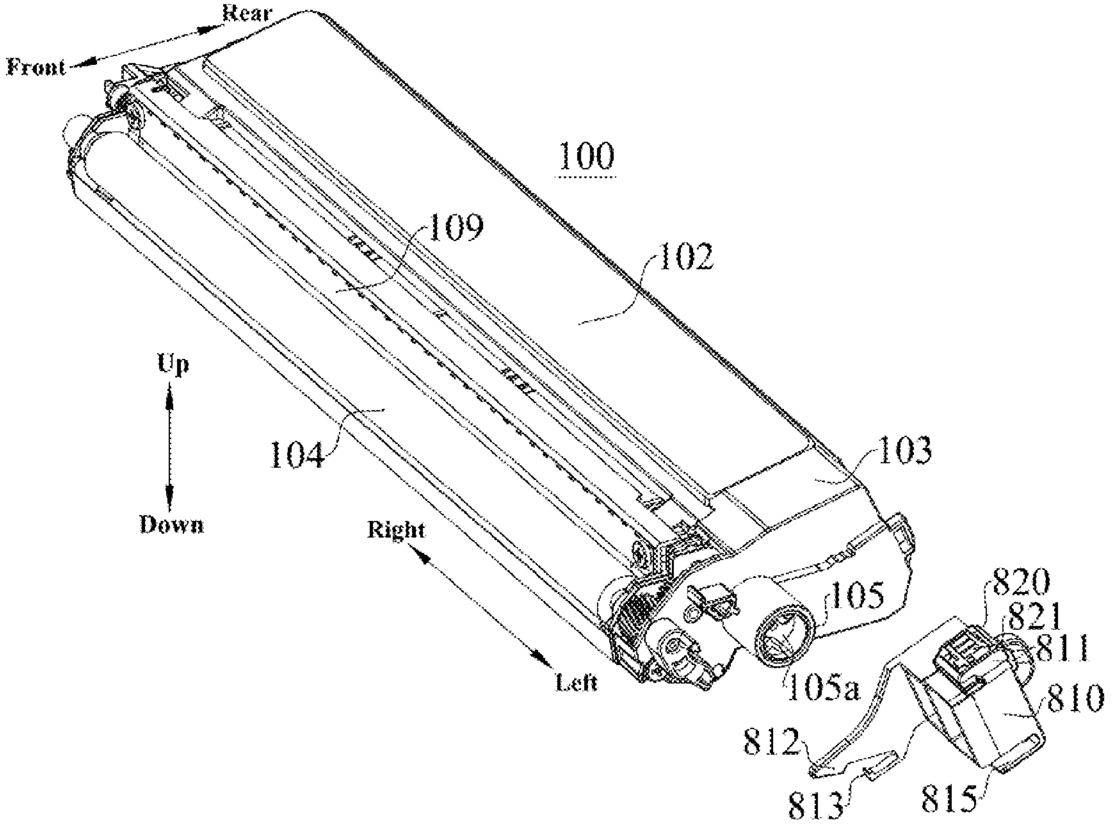
FIG. 45 is a schematic view of a three-dimensional structure of a developing cartridge according to Embodiment 7 of the present disclosure.
Figure 46:
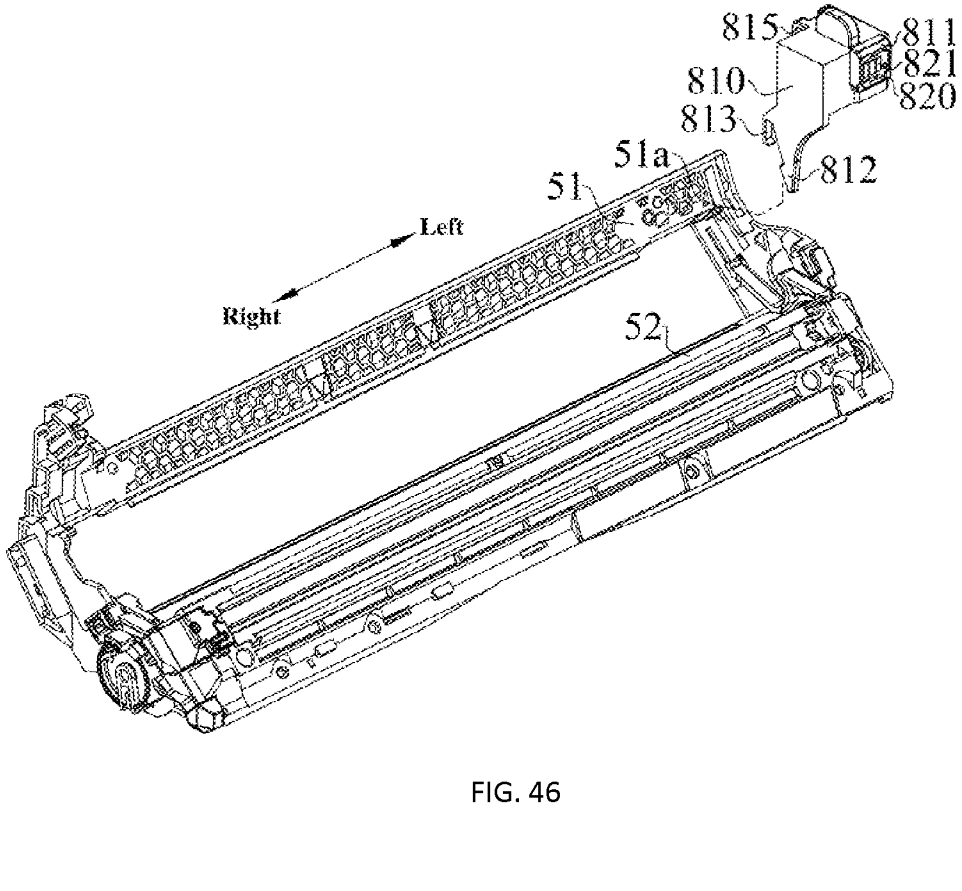
FIG. 46 is a schematic view of a three-dimensional structure of a drum cartridge and the storage assembly according to Embodiment 7 of the present disclosure.
Figure 47:
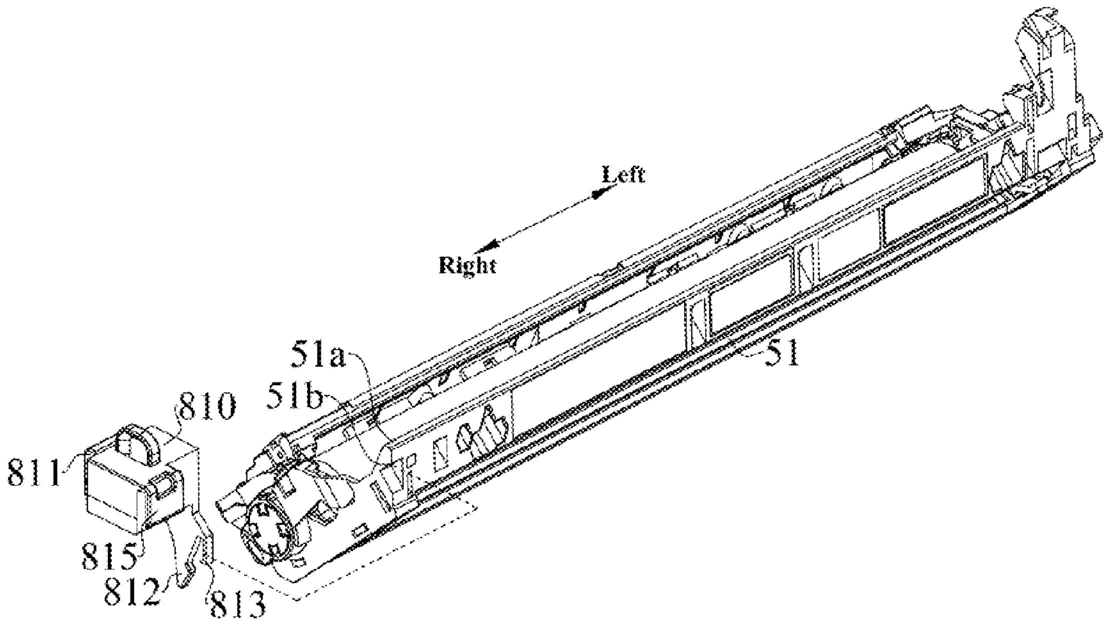
FIG. 47 is a schematic view of a three-dimensional structure of the drum cartridge and the storage assembly according to Embodiment 7 of the present disclosure from another angle.
Figure 48:
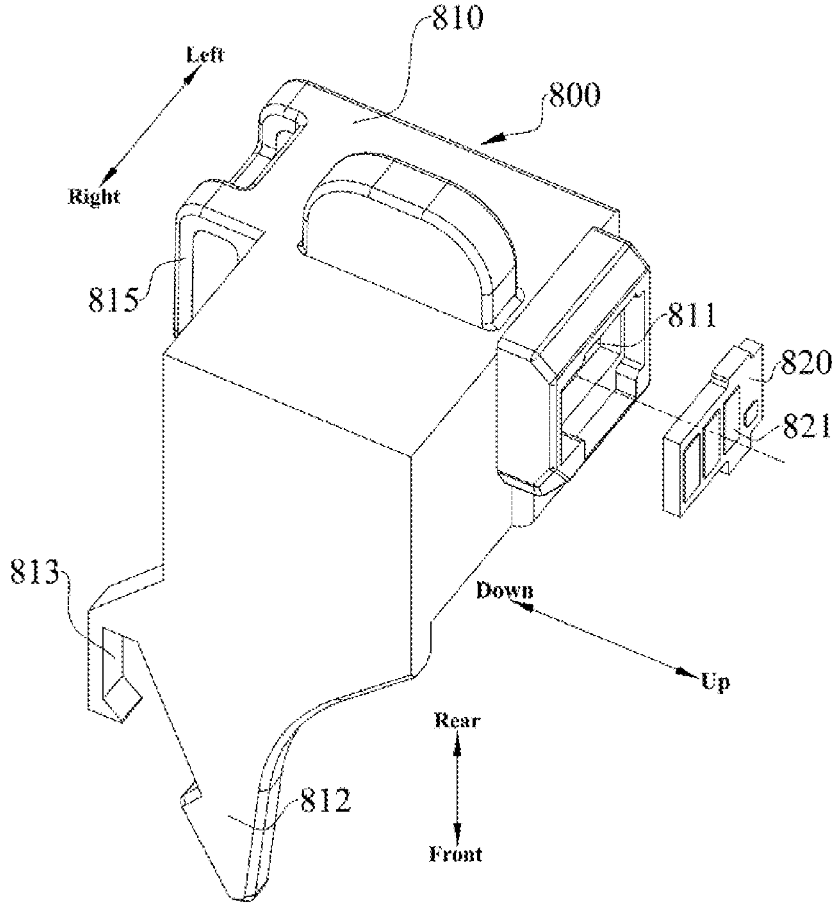
FIG. 48 is a schematic exploded view of a holder and a chip being mounted in the storage assembly according to Embodiment 7 of the present disclosure.
Figure 49:
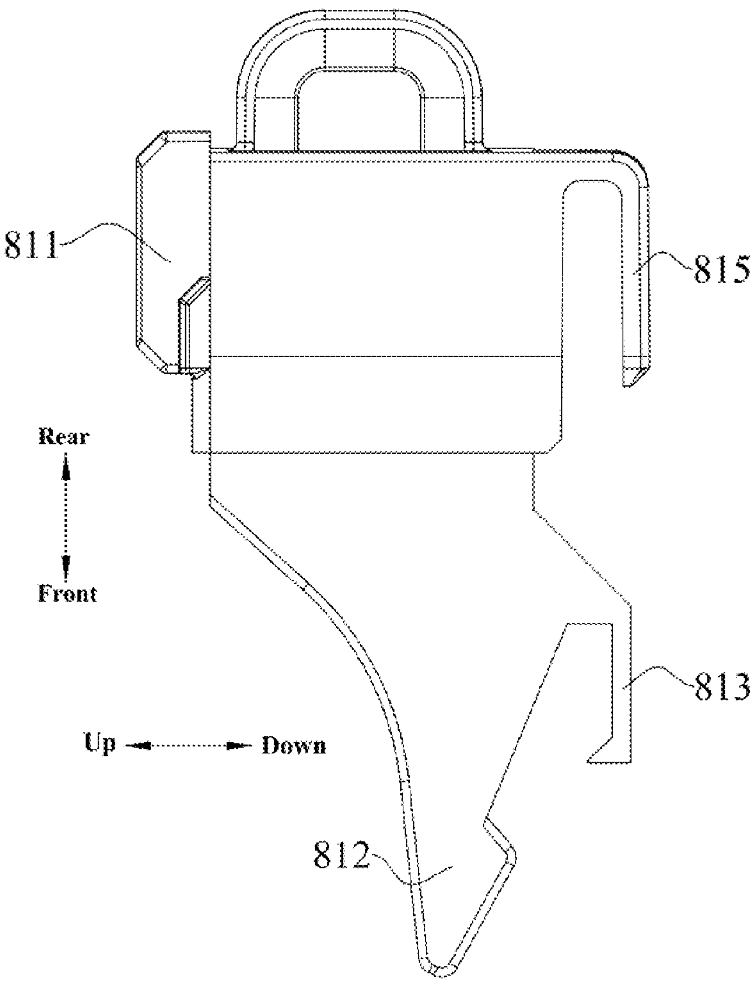
FIG. 49 is a schematic view of a three-dimensional structure of the storage assembly according to Embodiment 7 of the present disclosure.
Figure 50:
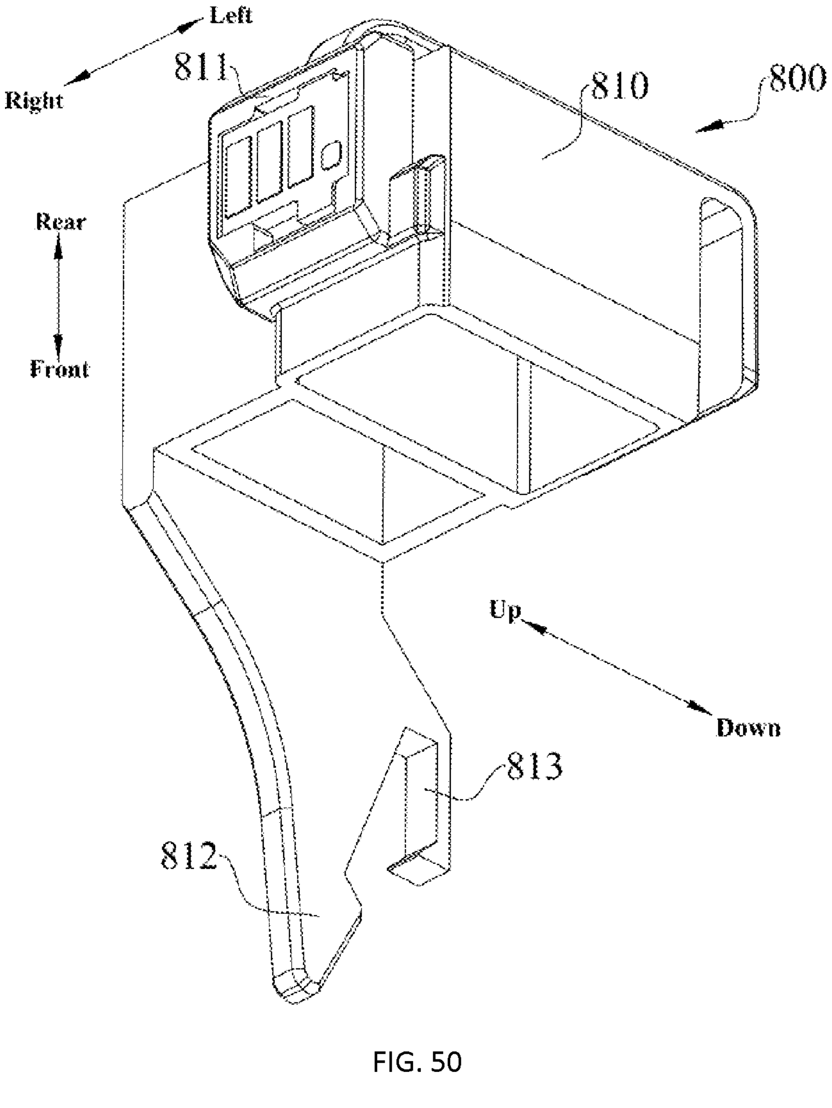
FIG. 50 is a schematic view of a three-dimensional structure of the storage assembly according to Embodiment 7 of the present disclosure from another angle.
Figure 51:
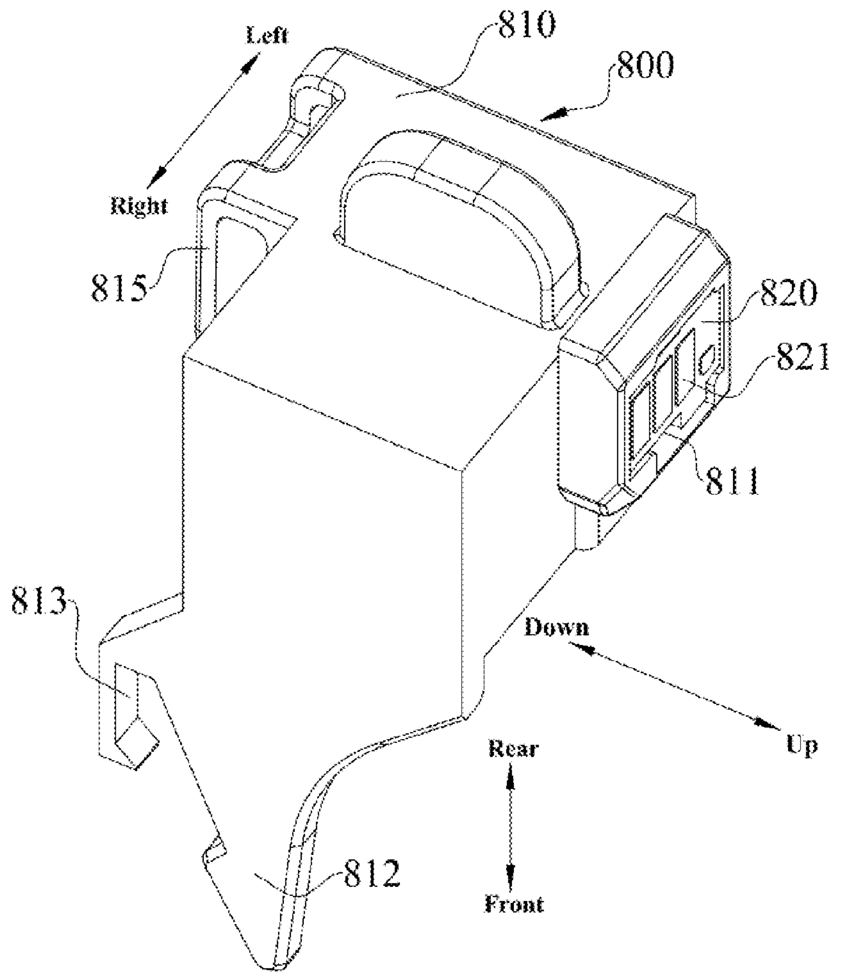
FIG. 51 is a schematic view of a three-dimensional structure of the storage assembly according to Embodiment 7 of the present disclosure from still another angle.

As shown in FIG. 43, the storage assembly 700 includes a chip holder 710 and a chip 720. The chip holder 710 has a main body portion and a chip mounting portion 711. The chip mounting portion 711 is used to accommodate the chip 720. The chip 720 is used to store the information of the developing cartridge 100 and/or the drum cartridge 50. That is, the chip 720 stores the information of the developing cartridge 100 or the drum cartridge 50. The chip 720 may also simultaneously store the information of the developing cartridge 100 and the drum cartridge 50.

As shown in FIGS. 40-42 and 44, the main body portion of the chip holder 710 extends in the front-rear direction. The chip holder 710 is trapezoidal in shape as a whole when viewed from the left-to-right direction. The chip holder 710 has an elastic portion 715. The elastic portion 715 is used to provide a force for moving an electrical contact surface 721 toward the electrical contact head 4. The elastic portion 715 is located below the chip accommodating portion 711 in the up-down direction. That is, the elastic portion 715 provides the electrical contact surface 721 with a force to move upward at least in the up-down direction and contact the electrical contact head 4, so that the contact between the electrical contact surface 721 and the electrical contact head 4 is closer, thereby improving the stability of the electrical connection between the electrical contact surface 721 and the electrical contact head 4.

Figure 39:
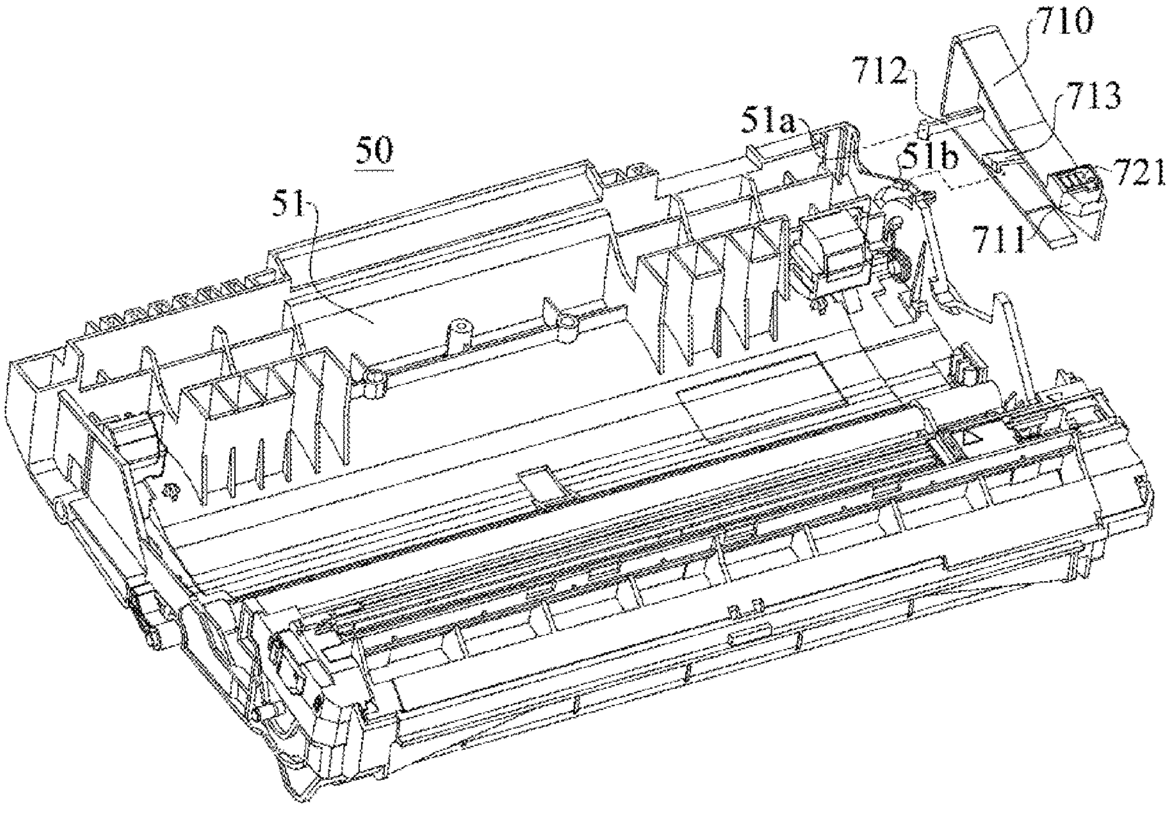
FIG. 39 is a schematic view of a three-dimensional structure of a drum cartridge and the storage assembly according to Embodiment 6 of the present disclosure.
Figure 40:
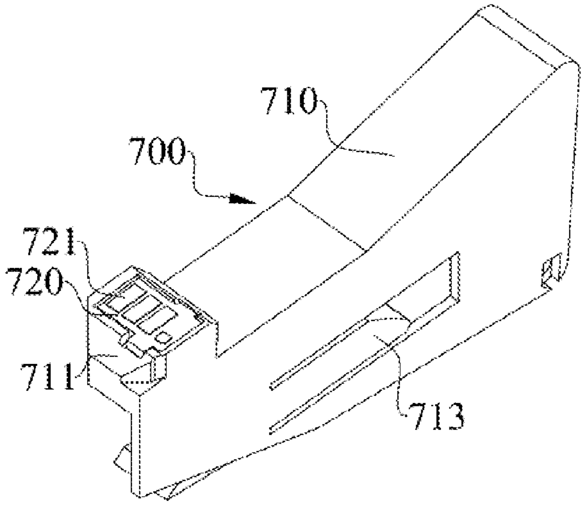
FIG. 40 is a schematic view of a three-dimensional structure of the storage assembly according to Embodiment 6 of the present disclosure.
Figure 41:
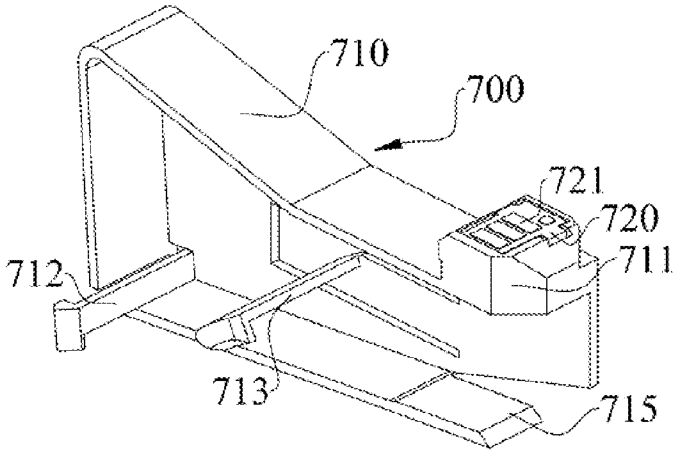
FIG. 41 is a schematic view of a three-dimensional structure of the storage assembly according to Embodiment 6 of the present disclosure from another angle.
Figure 42:
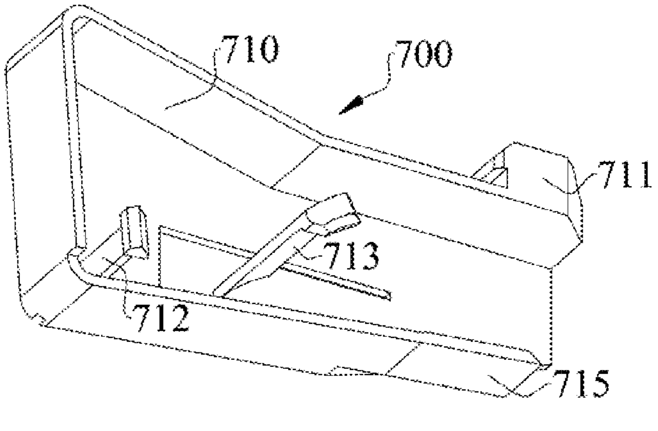
FIG. 42 is a schematic view of a three-dimensional structure of the storage assembly according to Embodiment 6 of the present disclosure from still another angle.

As shown in FIG. 39, the chip holder 710 further includes a plurality of connecting portions. In this embodiment, the chip holder 710 further includes a first connecting portion 712 and a second connecting portion 713. In a state where the storage assembly 700 is mounted to the imaging device, the chip holder 710 is connected to the drum cartridge 50 through the first connecting portion 712 and the second connecting portion 713. The drum cartridge 50 includes a drum frame 51. The drum frame 51 has a first clamping portion 51*a* and a second clamping portion 51*b*. In a state where the storage assembly 700 is mounted to the imaging device together with the drum cartridge 50, the first connecting portion 712 is matched with the first clamping portion 51*a,* and the second connecting portion 713 is matched with the second clamping portion 51*b,* so that the storage assembly 700 can be clamped on the drum cartridge 50. That is, in the state where the storage assembly 700 and the drum cartridge 50 are mounted to the imaging device, the storage assembly 700 is connected to the drum cartridge 50. When the user removes the drum cartridge 50 from the imaging device, the drum cartridge 50 may drive the storage assembly 700 to be removed from the interior of the imaging device.

During installation and use, the user first opens the outer cover of the imaging device and takes out the original developing cartridge and the drum cartridge 50, then installs the developing cartridge 100 and drum cartridge 50. Then, the user moves the storage assembly 700 to the rear side of the accommodating portion in the imaging device. Thereafter, the user aligns the storage assembly 700 with the accommodating portion and moves the storage assembly 700 forward to the interior of the accommodating portion. In the process of mounting the storage assembly 700 to the accommodating portion, the user applies a forward thrust force to the storage assembly 700 in the front-rear direction, and an elastic portion 715 of a mounting bracket 710 abuts against the inner surface of the accommodating portion to receive an abutting force exerted on the elastic portion 715 of the mounting bracket 710 by the inner surface of the accommodating portion in the up-down direction. Under the action of the thrust force and the abutting force, the elastic portion 715 is deformed to accumulate elastic force. At this time, under the action of the elastic force, the mounting bracket 710 moves in the up-down direction toward the side close to the electrical contact head 4, so that the electrical contact surface 721 of the chip 720 is in contact with the electrical contact head 4. Moreover, under the action of the elastic force provided by the elastic portion 715, the mounting bracket 710 maintains a tendency to move in the up-down direction toward the side close to the electrical contact surface 721, so as to maintain the contact between the electrical contact surface 721 and the electrical contact head 4, thereby making the electrical connection of the chip 720 and the imaging device more stable.

Embodiment 7

Next, Embodiment 7 of the present disclosure will be described in detail with reference to FIGS. 45-51. This embodiment provides a developing cartridge. The same parts of the developing cartridge of this embodiment as those of the developing cartridge in the aforementioned embodiments will not be repeated in this embodiment. The difference is that the storage assembly is different from that in Embodiments 1-6 described above.

A storage assembly 800, a developing cartridge 100 and a drum cartridge 50 are shown in FIGS. 45-51. The storage assembly 800, the developing cartridge 100 and the drum cartridge 50 can be mounted in an imaging device in a detachable manner. The storage assembly 800 includes a chip holder 810 and a chip 820. The chip holder 810 has a main body portion and a chip mounting portion 811. The chip mounting portion 811 is used to accommodate the chip 820. The chip 820 is used to store information of the developing cartridge 100 and/or the drum cartridge 50. That is, the chip 820 stores the information of the developing cartridge 100 or the drum cartridge 50. The chip 820 may also simultaneously store the information of the developing cartridge 100 and the drum cartridge 50.

The main body portion of the chip holder 810 extends in the front-rear direction. The chip holder 810 is trapezoidal in shape as a whole when viewed from the left-right direction. The chip holder 810 has an elastic portion 815. The elastic portion 815 is used to provide a force for moving an electrical contact surface 821 toward the electrical contact head 4. The elastic portion 815 is located below the chip accommodating portion 811 in the up-down direction. That is, the elastic portion 815 provides the electrical contact surface 821 with a force to move upward at least in the up-down direction and contact an electrical contact head 4, so that the contact between the electrical contact surface 821 and the electrical contact head 4 is closer, thereby improving the stability of the electrical connection between the electrical contact surface 821 and the electrical contact head 4.

The chip holder 810 further includes a plurality of connecting portions. In this embodiment, the chip holder 810 further includes a first connecting portion 812 and a second connecting portion 813. In a state where the storage assembly 800 is mounted to the imaging device, the chip holder 810 is connected to the drum cartridge 50 through the first connecting portion 812 and the second connecting portion 813. The drum cartridge 50 includes a drum frame 51. The drum frame 51 has a first clamping portion 51*a* and a second clamping portion 51*b*. In a state where the storage assembly 800 is mounted to the imaging device together with the drum cartridge 50, the first connecting portion 812 is matched with the first clamping portion 51*a*, and the second connecting portion 813 is matched with the second clamping portion 51*b*. As a result, the storage assembly 800 can be clamped on the drum cartridge 50, that is, in the state where the storage assembly 800 and the drum cartridge 50 are mounted to the imaging device, the storage assembly 800 is connected to the drum cartridge 50. As a result, when the user removes the drum cartridge 50 from the imaging device, the drum cartridge 50 may drive the storage assembly 800 to be removed from the interior of the imaging device.

Embodiment 8

FIGS. 52-57 show a structure of a chip holder provided in Embodiment 8 of the present application, which is different from the aforementioned embodiments in that the structure and installation method of the chip holder are different. It will be described in detail below.

Figure 52:
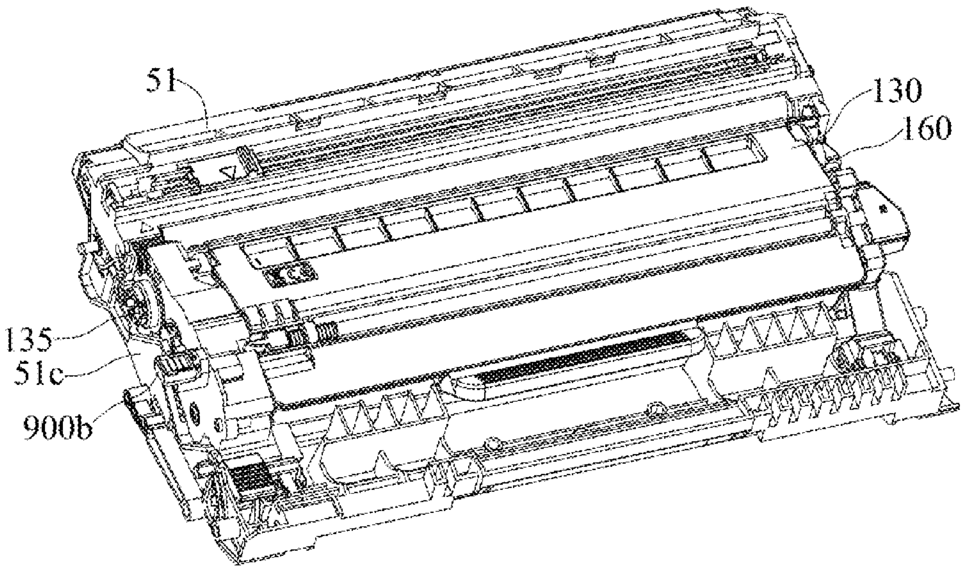
FIG. 52 is a schematic view of a developing cartridge according to Embodiment 8 of the present disclosure that is mounted in a drum cartridge, from one angle.
Figure 53:
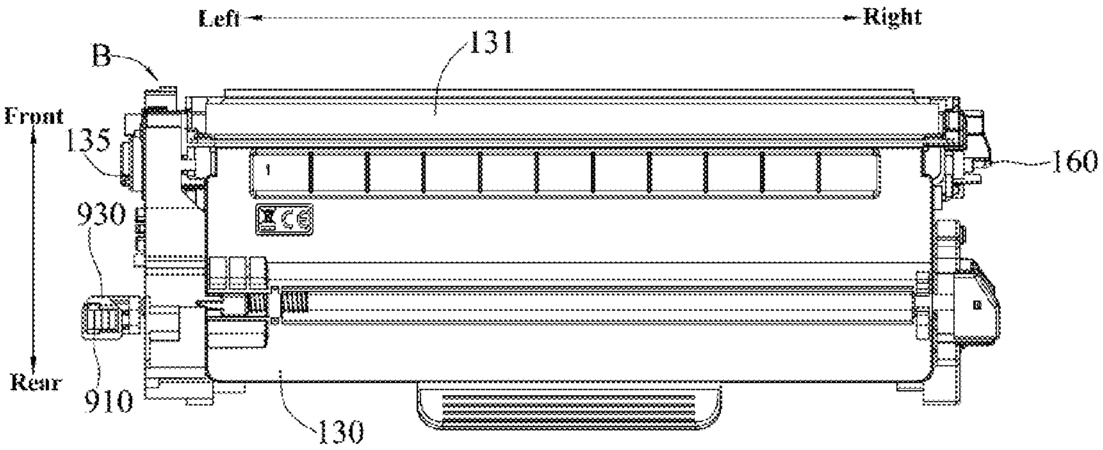
FIG. 53 is a schematic view of the developing cartridge according to Embodiment 8 of the present disclosure and a chip at a position from one angle.

As shown in FIGS. 52 and 53, the chip holder 930 is detachably mounted on an imaging device C. When mounting a developing cartridge B and a drum cartridge A into the imaging device C, the chip holder 930 is first mounted on the imaging device C so that the chip 910 mounted on the chip holder 930 may be stably electrically connected to an electrical contact point C5 on the imaging device C. Then, the developing cartridge B and the drum cartridge A are mounted into the imaging device C to complete the installation of the developing cartridge B and the drum cartridge A, so that the imaging device C can print normally. A chip assembly 900*b* is mounted separately from the developing cartridge B and the drum cartridge A, and a modular structural design is adopted, which facilitates the replacement of the chip when the chip 910 is upgraded, and simplifies the design structure of the developing cartridge B and the drum cartridge A.

Figure 54:
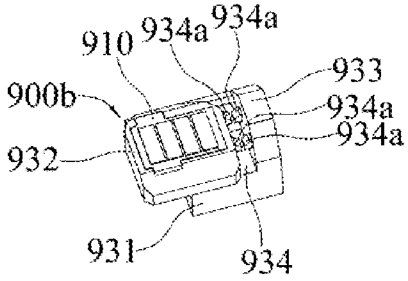
FIG. 54 is a schematic view of a chip assembly according to Embodiment 8 of the present disclosure from one angle.
Figure 55:
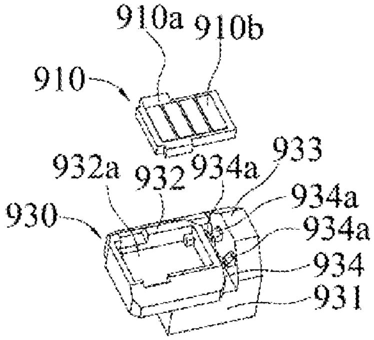
FIG. 55 is a schematic exploded view of the chip assembly according to Embodiment 8 of the present disclosure.
Figure 57:
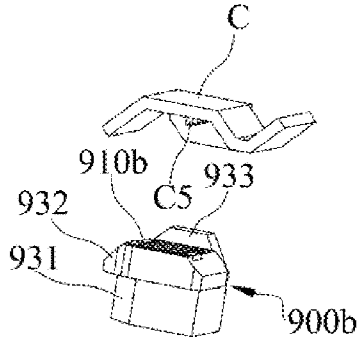
FIG. 57 is a schematic view of the chip assembly according to Embodiment 8 of the present disclosure being mounted in the imaging device at another angle.

As shown in FIGS. 54 and 57, specifically, the chip assembly 900*b* includes a chip holder 930 and a chip 910 mounted on the chip holder 930. The chip holder 930 includes a main body portion 931, a chip mounting portion 932, and a positioning portion 933. The chip assembly 900*b* may be mounted on the imaging device C and electrically connected to the imaging device C. The main body portion 931 is configured as a square base, and the chip mounting portion 932 is formed by extending from the main body portion 931 in the left-right direction. In the up-down direction, the chip mounting portion 932 is above the main body portion 931. A mounting groove 932*a* is concavely formed on the upper surface of the chip mounting portion 932. The size and shape of the mounting groove 932*a* are matched with the size and shape of the chip 910. The chip 910 is mounted in the mounting groove 932*a*. The chip 910 may be adhered to the mounting groove 932*a* by means of, for example, gluing. However, it is not limited thereto. The chip 910 may also be restricted to the mounting groove 932*a* by providing an elastic buckle structure on the chip mounting portion 932. There are many ways to implement it, as long as the chip 910 can be firmly mounted on the mounting groove 932*a*. The positioning portion 933 is formed by extending from the main body portion 931 in the up-down directions. The imaging device C is provided with a recess at a corresponding position. When the chip assembly 900*b* is mounted on the imaging device C, the positioning portion 933 enters the recess and limits the displacement of the chip assembly 900*b* in the left-right direction. Meanwhile, the end of the positioning portion 933 is set to a shape with a gradually decreasing width, which can guide the installation of the chip assembly 900*b*. A positioning groove 934 is further formed between the positioning portion 933 and the chip mounting portion 932. Similarly, the imaging device C is provided with a convex portion C6 at a corresponding position. When the chip assembly 900*b* is mounted on the imaging device C, the convex portion C6 enters the positioning groove 934 for positioning. Further, the positioning groove 934 has a first side wall (unlabeled) and a second side wall (unlabeled) that are oppositely disposed in the left-right direction. At least one pair of fixing protrusions 934*a* are provided on the first side wall and the second side wall. The imaging device is correspondingly provided with fixing holes C61. Each pair of fixing protrusions 934*a* is disposed corresponding to the fixing holes C61. When the chip assembly 900*b* is mounted on the imaging device C, the fixing protrusions 934*a* enter the fixing holes C61 from both sides of the fixing holes C61 to position the chip assembly 900*b*. The fixing protrusion 934*a* has a guiding slope to guide the convex portion C6 of the imaging device C into the positioning groove 934.

Figure 56:
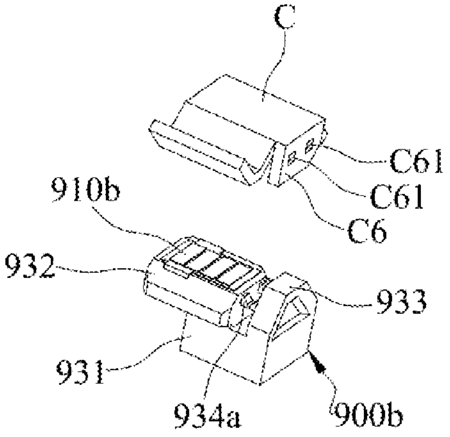
FIG. 56 is a schematic view of the chip assembly according to Embodiment 8 of the present disclosure being mounted in an imaging device at one angle.

As shown in FIGS. 56 and 57, when in actual use, the chip assembly 900*b* needs to be used in cooperation with a corresponding developing cartridge B. The chip 910 in the chip assembly 900*b* corresponds to the developing cartridge B. The chip 910 includes a substrate 910*a* that is roughly configured in a plate shape. An electrical contact surface 910*b* and a storage portion are provided on two opposite surfaces of the substrate 910*a*. The electrical contact surface 910*b* may be electrically connected to an electrical contact point C5 of the imaging device C. The storage portion stores relevant parameter information, such as model and capacity size, of the corresponding developing cartridge B. The chip 910 can establish a communication connection with the imaging device C through the electrical connection between the electrical contact surface 910*b* and the imaging device C, and then the relevant parameter information of the developing cartridge B can be identified through the storage portion. When the chip assembly 900*b* is mounted to the imaging device C together with the corresponding developing cartridge B for use, the electrical contact surface 910*b* and the chip assembly 900*b* are separated from the developing cartridge B in the left-right direction, and the electrical contact surface 910*b* and the chip assembly 900*b* are located on the left side of the developing cartridge B. In the front-rear direction, the electrical contact surface 910*b* and the chip assembly 900*b* are closer to the rear end of the developing cartridge B relative to the front end of the developing cartridge B.

Beneficial Effects

In the present disclosure, the storage assembly is detachably mounted on the drum cartridge. When the process cartridge is in use, the storage assembly on the drum cartridge can establish a communication connection with an imaging device independently of the developing cartridge. Thus, even if the storage assembly is not provided on the developing cartridge, the process cartridge can be used normally, thereby making the process cartridge more convenient to use. In addition, after the developer in the developing cartridge is used up, only the developing cartridge needs to be handled, such as adding developer or replacing the developing cartridge with a new one, without replacing the storage assembly. On the other hand, the same storage assembly can be matched and used with multiple developing cartridges, and the storage assembly does not need to be replaced frequently, which is beneficial to improving the economic efficiency of the drum cartridge.

What is claimed is:

1. A storage assembly, wherein the storage assembly is configured to be mounted in an imaging device having an electrical contact point and to be separate from a developing cartridge;

wherein the storage assembly comprises:

a chip configured to store information of the developing cartridge, the chip having an electrical contact surface;

a holder configured to support the electrical contact surface; and an elastic component on the holder and configured to urge the electrical contact surface.

2. The storage assembly according to claim 1, wherein the elastic component is configured to move in a direction intersecting the electrical contact surface, causing the electrical contact surface to move toward the electrical contact point.

3. The storage assembly according to claim 1, wherein the elastic component is between the holder and the electrical contact surface, and the electrical contact surface is configured to move relative to the holder as a result of movement of the elastic component.

4. The storage assembly according to claim 1, wherein the holder comprises a first holder and a second holder, the first holder is configured to support the electrical contact surface, and the first holder is movable relative to the second holder.

5. The storage assembly according to claim 4, wherein the first holder comprises an elastic buckle thereon and the second holder comprises a slide groove thereon or wherein the second holder comprises the elastic buckle thereon and the first holder comprises the slide groove thereon; and wherein the elastic buckle is configured to connect with the slide groove.

6. The storage assembly according to claim 1, wherein in another direction intersecting the electrical contact surface, the holder comprises, on one side thereof, a chip accommodating portion for accommodating the chip, and on another side thereof, the elastic component.

7. The storage assembly according to claim 1, wherein the elastic component is an elastic sheet integral with and extending from one side of the holder.

8. A storage assembly, wherein the storage assembly is configured to be mounted in an imaging device having an electrical contact point and to be separate from a developing cartridge comprising a rotatable developing roller extending in a first direction;

wherein the storage assembly comprises:

a chip configured to store information of the developing cartridge, the chip having an electrical contact surface configured to electrically connect to the electrical contact point; and a holder configured to support the chip;

wherein the electrical contact surface is spaced apart from the developing roller in the first direction when the storage assembly and the developing cartridge are mounted in the imaging device.

9. The storage assembly according to claim 8, wherein the developing cartridge has a first side surface and a second side surface separately disposed in the first direction, and wherein when the storage assembly and the developing cartridge are mounted in the imaging device, at least a part of the electrical contact surface is farther away from the second side surface of the developing cartridge in the first direction than the first side surface of the developing cartridge is from the second side surface of the developing cartridge in the first direction.

10. The storage assembly according to claim 8, wherein the imaging device further comprises a drum cartridge, wherein the storage assembly further comprises a supported surface, wherein the drum cartridge comprises a photosensitive drum and a drum frame supporting the photosensitive drum;

wherein the drum frame comprises a supporting surface, and the supported surface is configured to be supported by the supporting surface; and wherein in a direction intersecting the electrical contact surface, the supported surface is on a side of the holder away from the electrical contact surface.

11. The storage assembly according to claim 10, wherein the holder comprises a connecting portion connected to the drum frame, and wherein when the electrical contact surface is upward in an up-down direction, the connecting portion is below the electrical contact surface in the up-down direction.

12. The storage assembly according to claim 11, wherein the connecting portion comprises a first connecting portion and a second connecting portion, the drum frame comprises a first clamping portion and a second clamping portion, the first connecting portion is configured to connect with the first clamping portion, and the second connecting portion is configured to connect with the second clamping portion; and wherein the first connecting portion and the second connecting portion are arranged in a second direction intersecting the first direction.

13. The storage assembly according to claim 10, wherein the drum frame has a first side and a second side separated in the first direction, the drum frame comprises a supporting protrusion extending in the first direction from the first side, and the holder is configured to be supported by the supporting protrusion.

14. The storage assembly according to claim 13, wherein the supporting protrusion comprises a surface facing the electrical contact surface, the surface comprises a positioning protrusion extending outward, the holder comprises a mounting hole, and the holder is configured to be positioned and mounted on the drum frame by mating the mounting hole and the positioning protrusion.

15. The storage assembly according to claim 14, wherein the mounting hole and the electrical contact surface have an overlapping portion in a direction intersecting the electrical contact surface.

16. A mountable unit, comprising a storage assembly and a developing cartridge, wherein the developing cartridge is configured to be mounted in an imaging device having an electrical contact point and to be separate from the storage assembly;

wherein the imaging device comprises a first accommodating area and a second accommodating area;

wherein the developing cartridge is accommodated in the first accommodating area, and the storage assembly is accommodated in the second accommodating area;

wherein the first accommodating area and the second accommodating area are adjacent to each other in a first direction;

wherein the first accommodating area comprises a photosensitive drum, and the second accommodating area comprises an electrical contact point;

wherein the storage assembly comprises a chip with an electrical contact surface, and the chip is configured to store information of the developing cartridge;

wherein the developing cartridge comprises:

a casing configured to accommodate developer; and a developing roller rotatable about a developing roller axis extending in the first direction; and wherein the electrical contact surface is spaced apart from the developing roller in the first direction when the developing cartridge and the storage assembly are mounted in the imaging device.

17. The mountable unit according to claim 16, wherein when the storage assembly and the developing cartridge are mounted in the imaging device, at least a part of the electrical contact surface is further away from an end of the casing closer to the electrical contact surface in the first direction than an end of the developing roller is from an end of the casing closer to the electrical contact surface in the first direction.

18. The mountable unit according to claim 16, wherein the developing cartridge further comprises an input gear configured to receive an external driving force, and the electrical contact surface is further away from the developing roller in the first direction than the input gear is from the developing roller in a second direction intersecting the first direction.

19. The mountable unit according to claim 16, wherein the storage assembly comprises a holder configured to support the chip, the holder comprising a gripping portion, and a height of the gripping portion in a second direction intersecting the first direction is equal to or less than 9 mm.

20. The mountable unit according to claim 16, wherein a length of the storage assembly in a third direction intersecting the first direction is equal to or greater than 25 mm and is equal to or less than 31 mm.

* * * * *